(12) United States Patent
Rämö et al.

(10) Patent No.: US 11,483,651 B2
(45) Date of Patent: Oct. 25, 2022

(54) PROCESSING AUDIO SIGNALS

(71) Applicant: Nokia Technologies Oy, Espoo (FI)

(72) Inventors: Anssi Rämö, Tampere (FI); Arto Lehtiniemi, Lempäälä (FI); Antti Eronen, Tampere (FI); Lasse Laaksonen, Tampere (FI); Joonas Nikunen, Tampere (FI)

(73) Assignee: Nokia Technologies Oy, Espoo (FI)

( * ) Notice: Subject to any disclaimer, the term of this patent is extended or adjusted under 35 U.S.C. 154(b) by 63 days.

(21) Appl. No.: 17/284,057

(22) PCT Filed: Oct. 1, 2019

(86) PCT No.: PCT/FI2019/050702
§ 371 (c)(1),
(2) Date: Apr. 9, 2021

(87) PCT Pub. No.: WO2020/074771
PCT Pub. Date: Apr. 16, 2020

(65) Prior Publication Data
US 2021/0392434 A1 Dec. 16, 2021

(30) Foreign Application Priority Data
Oct. 10, 2018 (GB) .................................. 1816498

(51) Int. Cl.
H04R 3/00 (2006.01)
G10L 25/21 (2013.01)
(Continued)

(52) U.S. Cl.
CPC .............. H04R 3/005 (2013.01); G10L 25/21 (2013.01); H04R 1/04 (2013.01); H04R 1/406 (2013.01)

(58) Field of Classification Search
CPC .......... H04R 3/005; H04R 1/04; H04R 1/406; G10L 25/21
(Continued)

(56) References Cited

U.S. PATENT DOCUMENTS 7,715,575 B1    5/2010  Sakurai et al.
9,031,268 B2 *  5/2015  Fejzo ..................... H04S 7/303
                                                  381/310
(Continued)

FOREIGN PATENT DOCUMENTS

EP    2785032 A1    10/2014
GB    2545263 A  *  6/2017  ......... G10L 21/0208
(Continued)

OTHER PUBLICATIONS

Barker et al., "The third 'CHiME' Speech Separation and Recognition Challenge: Dataset, Task and Baselines", IEEE Workshop on Automatic Speech Recognition and Understanding (ASRU), Dec. 2015, pp. 504-511.
(Continued)

Primary Examiner — William A Jerez Lora
(74) Attorney, Agent, or Firm — Nokia Technologies Oy

(57) ABSTRACT

An apparatus, method and computer program is described comprising: receiving a near-field audio source signal from a near-field microphone (22); receiving a far-field audio signal from an array comprising one or more far-field microphones (23); determining a filter length of a first portion of a room impulse response filter for the near-field microphone, wherein said filter length of said first portion is the same at each of a plurality of frequency bands of the filter and wherein said filter length of said first portion includes a direct acoustic propagation delay; and determining a filter length of a second portion of the room impulse response
(Continued)

filter at each of the plurality of frequency bands, wherein the filter length of said second portion is frequency-dependent.

20 Claims, 12 Drawing Sheets

(51) Int. Cl.
  *H04R 1/04* (2006.01)
  *H04R 1/40* (2006.01)
(58) Field of Classification Search
  USPC .................. 381/56, 58, 92, 94.3, 122, 124
  See application file for complete search history.

(56) References Cited

U.S. PATENT DOCUMENTS

| | | | |
|---|---|---|---|
| 10,872,602 B2* | 12/2020 | Nosrati | G10L 21/0232 |
| 2012/0288124 A1* | 11/2012 | Fejzo | H04R 5/02 |
| | | | 381/303 |
| 2014/0294211 A1 | 10/2014 | Schneider et al. | |
| 2015/0230041 A1 | 8/2015 | Fejzo et al. | |
| 2016/0345116 A1 | 11/2016 | Yen et al. | |
| 2017/0171396 A1 | 6/2017 | Sun | |
| 2018/0182411 A1 | 6/2018 | Kaskari et al. | |
| 2019/0253821 A1* | 8/2019 | Buchner | H04R 5/04 |
| 2019/0349471 A1* | 11/2019 | Ferguson | H04M 3/002 |

FOREIGN PATENT DOCUMENTS

| | | |
|---|---|---|
| GB | 2566978 A | 4/2019 |
| WO | 2017/160294 A1 | 9/2017 |
| WO | 2018/091777 A1 | 5/2018 |
| WO | 2018/234617 A1 | 12/2018 |
| WO | 2018/234618 A1 | 12/2018 |
| WO | 2018/234619 A3 | 12/2018 |

OTHER PUBLICATIONS

Jiang et al., "A Revisit to Block and Recursive Least Squares for Parameter Estimation", Computers & Electrical Engineering, vol. 30, No. 5, Jul. 2004, pp. 403-416.

Waterschoot et al., "Optimally Regularized Recursive Least Squares for Acoustic Echo Cancellation", in Proceedings of the second annual IEEE BENELUX/DSP Valley Processing Symposium (SPS-DARTS 2006), Nov. 2005, pp. 31-34.

Gay, "Dynamically Regularized Fast RLS with Application to Echo Cancellation", IEEE International Conference on Acoustics, Speech, and Signal Processing Conference Proceedings, 1996, pp. 957-960.

Santos et al., "Blind Room Acoustics Characterization Using Recurrent Neural Networks and Modulation Spectrum Dynamics", Audio Engineering Society (AES) 60th International Conference, Feb. 3-5, 2016, pp. 1-8.

Li et al., "Estimation of the Direct-Path Relative Transfer Function for Supervised Sound-Source Localization", IEEE/ACM Transactions on Audio, Speech, and Language Processing, vol. 24, No. 11, 2016, pp. 1-15.

Search Report received for corresponding United Kingdom Patent Application No. 1816498.8, dated Apr. 1, 2019, 4 pages.

International Search Report and Written Opinion received for corresponding Patent Cooperation Treaty Application No. PCT/FI2019/050702, dated Dec. 4, 2019, 16 pages.

Nikunen et al., "Estimation of Time-Varying Room Impulse Responses of Multiple Sound Sources from Observed Mixture and Isolated Source Signals", IEEE International Conference on Acoustics, Speech and Signal Processing (ICASSP), 2018, pp. 421-425.

"Smaart 7 Impulse Response Measurement and Analysis Guide", Rationalacoustics, Retrieved on Nov. 22, 2019, Webpage available at: https://www.rationalacoustics.com/wp-content/uploads/2015/04/Smaart-v7-IR-Guide.pdf.

Kokkinis et al., Identification of a Room Impulse Response Using a Close-Microphone Reference Signal, Audio Engineering Society (AES) 128th Convention, Convention Paper 8025, May 22-25, 2010, pp. 1-8.

Office action received for corresponding United Kingdom Patent Application No. 1816498.8, dated Jun. 29, 2021, 3 pages.

Extended European Search Report received for corresponding European Patent Application No. 19871701.9, dated Jun. 7, 2022, 11 pages.

"AG06 Mixing Console", Yamaha, Retrieved on Jun. 8, 2022, Webpage available at: https://de.yamaha.com/files/download/other_assets/6/333126/ag06_de_om_a0.pdf.

* cited by examiner

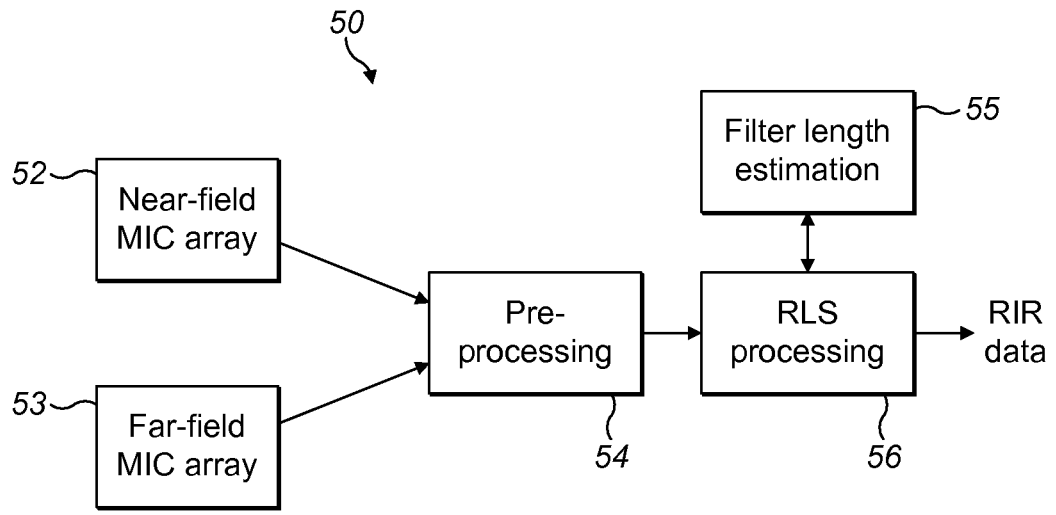
FIG. 4
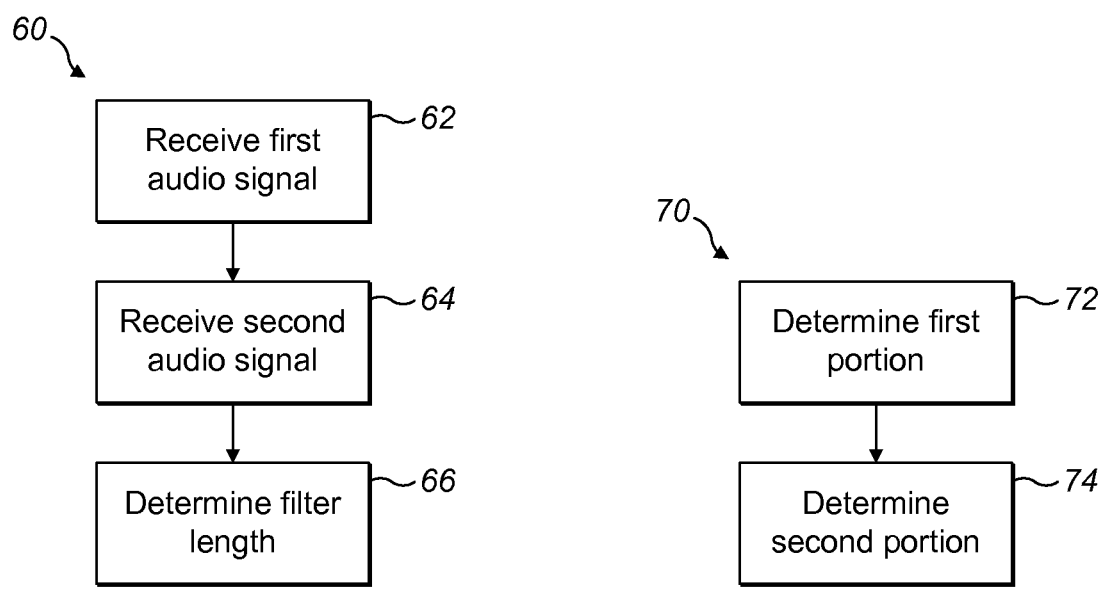
FIG. 5
FIG. 6

(b) With weighting (a) Without weighting

PROCESSING AUDIO SIGNALS

RELATED APPLICATION

This application claims priority to PCT Application No. PCT/FI2019/050702, filed on Oct. 1, 2019, which claims priority to GB Application No. 1816498.8, filed on Oct. 10, 2018, each of which is incorporated herein by reference in its entirety.

FIELD

This specification relates to processing audio signals and, more specifically, to determining a filter length of a room impulse response filter.

BACKGROUND

Audio systems can be used to mix captured audio signals, where the audio signals include audio captured from both near-field microphones and far-field microphones. The effect of a recording space on array can be modelled using one or more room impulse response filters (RIRs).

SUMMARY

In a first aspect, this specification describes an apparatus comprising: means (such as a near-field microphone) for receiving a near-field audio source signal from a near-field microphone; means (such as an array of one or more far-field microphones) for receiving a far-field audio signal from an array comprising one or more far-field microphones; means (such as a control module) for determining (e.g. setting) a filter length of a first portion of a room impulse response filter for the near-field microphone, wherein the filter length of said first portion is the same at each of a plurality of frequency bands of the filter and wherein said filter length of said first portion includes a direct acoustic propagation delay; and means (such as a control module) for determining (e.g. setting) a filter length of a second portion of the room impulse filter at each of the plurality of frequency bands, wherein the filter length of said second portion is frequency-dependent.

The means for determining the filter length of the first portion of the room impulse response filter may generate a direct-path delay estimation.

The means for determining the filter length of the first portion of the room impulse response filter may obtain a room impulse response filter envelope for the near-field audio source signal and may identify a delay corresponding to a maximum energy point of the envelope as an estimate of the direct acoustic propagation delay. Further, the means for determining the filter length of the first portion of the room impulse response filter may obtain a plurality of room impulse response filter envelopes for the near-field audio source signal and may identify an average maximum energy point (e.g. a mean or median maximum energy point) of the envelopes as an estimate of the direct acoustic propagation delay.

Some embodiments may include means for determining the filter length of the first portion of the room impulse response filter for each of a plurality of instances of near-field audio source signals received from a plurality of near-field microphones.

The means for determining the filter length of the first portion of the room impulse response filter and/or the means for determining the filter length of the second portion of the room impulse filter may be adaptive.

The filter length of the second portion of the room impulse filter for each of the plurality of frequency bands may comprise a reverberation time. In the event that a volume signal level is low, the second portion of the room impulse filter may be shorter (since the signal will decrease to an inaudible level faster). On the other hand, if the absolute sound level is higher for a particular sound source, the second portion of the room impulse filter may be longer. Accordingly, some embodiments may include means for determining a volume signal level and adjusting the second portion of the room impulse filter length accordingly.

Some embodiments may include means for limiting a rate of change of the filter length of the first portion and/or the filter length of the second portion of the room impulse response filter. The means for limiting the rate of change of the filter length may comprise means for preventing a further change for a first period of time in the event that a change in filter length is determined. Other arrangements for limiting the rate of change of filter length are also possible (such as allowing small changes, but not allowing large changes).

The means for determining the filter length of the first portion of the room impulse response filter may generate an estimate of said filter length of said first portion of said first portion based on a system geometry. Alternatively, or in addition, the means for determining the filter length of the second portion of the room impulse filter may generate an estimate of said filter length of said second portion based on a/the system geometry. In either case, the system geometry may be determined, at least in part, from a locator tag associated with the near-field microphone. Indeed, a plurality of near-field audio sources may be received from a plurality of near-field microphones, each having a locator tag (or similar device) associated therewith.

The means for determining the filter length of the first portion of the room impulse response filter may generate an estimate of the filter length including considering hardware and/or software delays. Such delays may be added to a geometry-based estimate. Such delays may be handled in a variety of ways, such as: neglected or ignored, set (e.g. manually) as system parameters, or assumed to be at a constant (e.g. a predefined constant).

The means may comprise: at least one processor; and at least one memory including computer program code, the at least one memory and the computer program code configured, with the at least one processor, to cause the performance of the apparatus.

In a second aspect, this specification describes a method comprising: receiving a near-field audio source signal from a near-field microphone; receiving a far-field audio signal from an array comprising one or more far-field microphones; determining a filter length of a first portion of a room impulse response filter for the near-field microphone, wherein said filter length of said first portion is the same at each of a plurality of frequency bands of the filter and wherein said filter length of said first portion includes a direct acoustic propagation delay; and determining a filter length of a second portion of the room impulse filter at each of the plurality of frequency bands, wherein the filter length of said second portion is frequency-dependent.

Determining the filter length of the first portion of the room impulse response filter may generate a direct-path delay estimation.

Determining the filter length of the first portion of the room impulse response filter may obtain a room impulse response filter envelope for the near-field audio source signal and may identify a delay corresponding to a maximum energy point of the envelope as an estimate of the direct acoustic propagation delay. Further, determining the filter length of the first portion of the room impulse response filter may obtain a plurality of room impulse response filter envelopes for the near-field audio source signal and may identify an average maximum energy point (e.g. a mean or median maximum energy point) of the envelopes as an estimate of the direct acoustic propagation delay.

The filter length of the second portion of the room impulse filter for each of the plurality of frequency bands may comprise a reverberation time.

Some embodiments may include means for limiting a rate of change of the filter length of the first portion and/or the filter length of the second portion of the room impulse response filter.

Determining the filter length of the first portion of the room impulse response filter may generate an estimate of said filter length of said first portion based on a system geometry. Alternatively, or in addition, determining the filter length of the second portion of the room impulse filter may generate an estimate of said filter length of the second portion based on a/the system geometry.

Determining the filter length of the first portion of the room impulse response filter may generate an estimate of the filter length including considering hardware and/or software delays.

In a third aspect, this specification describes any apparatus configured to perform any method as described with reference to the second aspect.

In a fourth aspect, this specification describes computer-readable instructions which, when executed by computing apparatus, cause the computing apparatus to perform any method as described with reference to the second aspect.

In a fifth aspect, this specification describes a computer program comprising instructions for causing an apparatus to perform at least the following: receiving a near-field audio source signal from a near-field microphone; receiving a far-field audio signal from an array comprising one or more far-field microphones; determining a filter length of a first portion of a room impulse response filter for the near-field microphone, wherein said filter length of said first portion is the same at each of a plurality of frequency bands of the filter and wherein said filter length of said first portion includes a direct acoustic propagation delay; and determining a filter length of a second portion of the room impulse filter at each of the plurality of frequency bands, wherein the filter length of said second portion is frequency-dependent.

In a sixth aspect, this specification describes a computer-readable medium (such as a non-transitory computer readable medium) comprising program instructions stored thereon for performing at least the following: receiving a near-field audio source signal from a near-field microphone; receiving a far-field audio signal from an array comprising one or more far-field microphones; determining a filter length of a first portion of a room impulse response filter for the near-field microphone, wherein said filter length of said first portion is the same at each of a plurality of frequency bands of the filter and wherein said filter length of said first portion includes a direct acoustic propagation delay; and determining a filter length of a second portion of the room impulse filter at each of the plurality of frequency bands, wherein the filter length of said second portion is frequency-dependent.

In a seventh aspect, this specification describes an apparatus comprising: at least one processor; and at least one memory including computer program code which, when executed by the at least one processor, causes the apparatus to: receive a near-field audio source signal from a near-field microphone; receive a far-field audio signal from an array comprising one or more far-field microphones; determine a filter length of a first portion of a room impulse response filter for the near-field microphone, wherein the filter length of said first portion is the same at each of a plurality of frequency bands of the filter and wherein the filter length of said first portion includes a direct acoustic propagation delay; and determine a filter length of a second portion of the room impulse filter at each of the plurality of frequency bands, wherein the filter length of said second portion is frequency-dependent.

In an eighth aspect, this specification describes an apparatus comprising: a near-field microphone for receiving a near-field audio source signal; an array of one or more far-field microphones for receiving a far-field audio signal; a first control module for determining (e.g. setting) a filter length of a first portion of a room impulse response filter for the near-field microphone, wherein said filter length of said first portion is the same at each of a plurality of frequency bands of the filter and wherein said filter length of said first portion includes a direct acoustic propagation delay; and a second control module for determining (e.g. setting) a filter length of a second portion of the room impulse filter at each of the plurality of frequency bands, wherein the filter length of said second portion is frequency-dependent.

BRIEF DESCRIPTION OF THE DRAWINGS

So that the invention may be fully understood, embodiments thereof will now be described with reference to the accompanying drawings, in which:

FIG. 4 is a block diagram of an audio processing system in accordance with an example embodiment;

FIG. 5 is a flow chart showing algorithm in accordance with example embodiment;

FIG. 6 is a flow chart showing algorithm in accordance with example embodiment;

DETAILED DESCRIPTION

Figure 1:
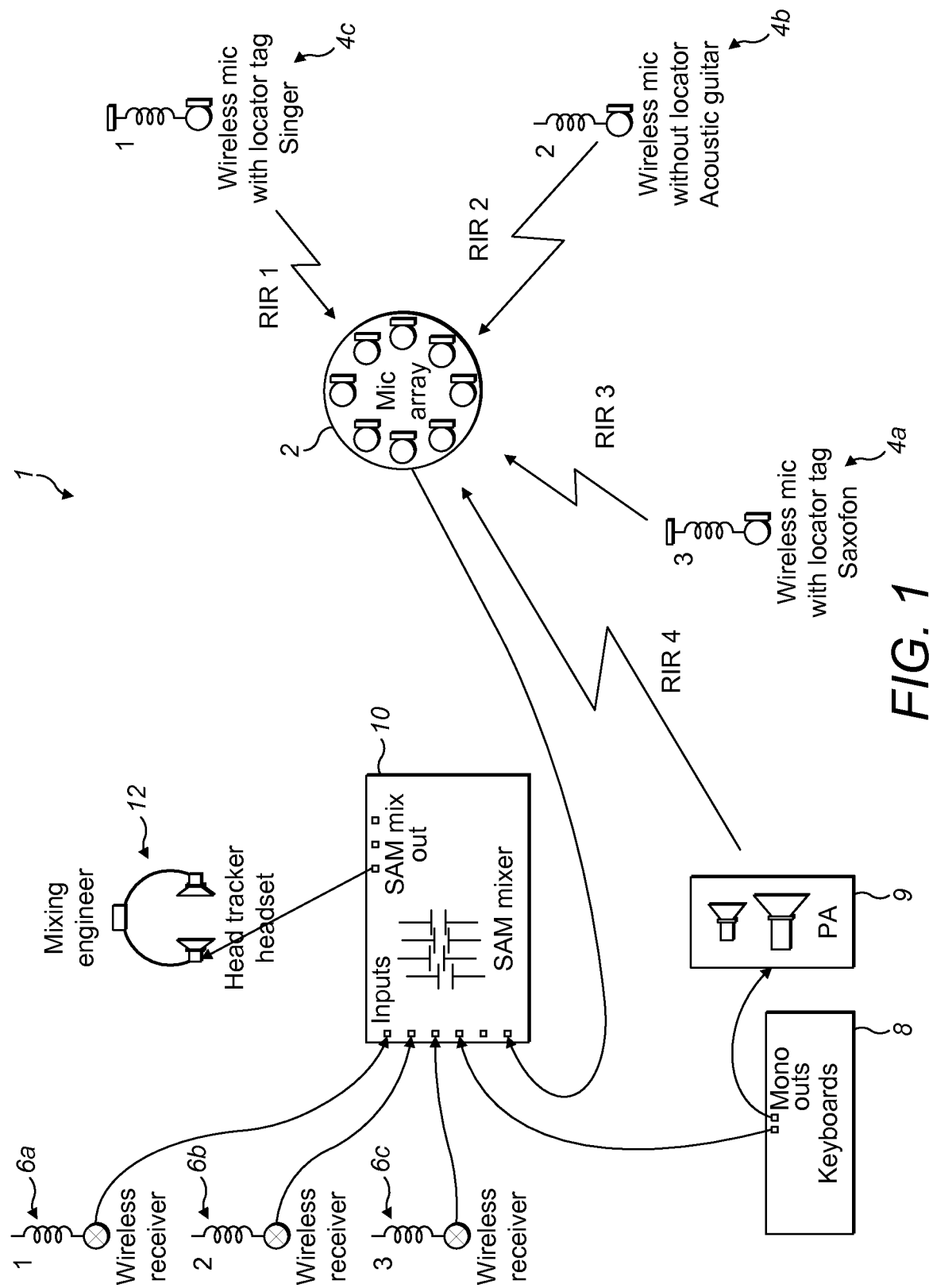
FIG. 1 is a block diagram of an audio system in accordance with an example embodiment.

In the description and drawings, like reference numerals refer to like elements throughout.

Embodiments described herein relate to the use of audio signals received from one or more near-field microphone(s) and from a one or more far-field microphone(s). Example near-field microphones include Lavalier microphones which may be worn by a user to allow hands-free operation or a handheld microphone. In some embodiments, at least some of the near-field microphones may be location tagged. The near-field signals obtained from near-field microphones may be termed "dry signals", in that they have little influence from the recording space and have relatively high signal-to-noise ratio (SNR).

Far-field microphones are microphones that are located relatively far away from a sound source. In some embodiments, an array of far-field microphones may be provided, for example in a mobile phone or in a Nokia Ozo® or similar audio recording apparatus. Devices having multiple microphones may be termed multi-channel devices and can detect an audio mixture comprising audio components received from the respective channels.

FIG. 1 is a block diagram of an audio system, indicated generally by the reference numeral 1, in accordance with an example embodiment.

The audio system 1 comprises an array of far-field microphones 2 (e.g. Eigenmike ambisonics microphones, mobile phones with spatial capture capability, a stereophonic video/audio capture device or similar recording apparatus such as the Nokia Ozo®) and a plurality of near-field microphones (such as wired or wireless Lavalier microphones) that may be worn by a user, such as a singer or an actor. The plurality of near-field microphones comprises a first wireless microphone 4a, a second wireless microphone 4b and a third wireless microphone 4c. The wireless microphones 4a to 4c are in wireless communication with first to third wireless receivers 6a to 6c respectively. A keyboard 8 is also provided within the audio system 1, the keyboard having an audio output system 9.

The audio system 1 comprises an audio mixer 10 that is controlled by a mixing engineer 12. The audio mixer receives audio inputs from the array of far-field microphones 2, the wireless receivers 6a to 6c (providing near-field audio data) and keyboard 8.

The far-field microphones detect audio data in the recording area received, for example, from the audio sources also detected by the near-field microphones 4a to 4c, the keyboard output as output by the audio output system 9 and any ambient sounds. The microphone signals from far-field microphones (such as the far-field microphones 2) may be termed "wet signals", in that they have significant influence from the recording space (for example from ambience, reflections, echoes, reverberation, and other sound sources). Wet signals tend to have relatively low SNR. In essence, the near-field and far-field signals are in different "spaces", near-field signals in a "dry space" and far-field signals in a "wet space".

When the originally "dry" audio content from the sound sources reaches the far-field microphone array the audio signals have changed because of the effect of the recording space. That is to say, the signals become "wet" and have a relatively low SNR. The near-field microphones 4a to 4c are much closer to the sound sources than the far-field microphone array. This means that the audio signals received at the near-field microphones are much less affected by the recording space. The dry signals have much higher signal to noise ratio and lower cross talk with respect to other sound sources. Therefore, the near-field and far-field signals are very different and mixing the two ("dry" and "wet") may result in audible artefacts or non-natural sounding audio content.

The effect of a recording space to the signals detected at the array of far-field microphones 2 can be modelled using a room impulse response (RIR) filter.

In a typical operation environment (room, stage, open outdoors) the initial delay between close-field and far-field signals varies depending on the source to receiver distance (acoustic propagation delay) and possible delays in wireless signal communication channel(s). In addition to the initial delay, the RIR filter needs to model the reverberation in the environment described by reverberation time (RT60). The larger initial delay increases the required RIR filter length in terms of STFT frames while the required effective length of the RIR dictated by the RT60 remains the same.

Excessively long filters are undesirable since they can cause over-modelling and/or overfitting effects due to too flexible model, which can lead to decreased subjective performance in the projection and removal. Also, long filters cause unnecessary computation and may cause performance issues in real-time implementation. Thus estimating the initial delay is useful for setting the appropriate length for the RIR filters to avoid overfitting or unnecessary computational load.

In addition to the initial delay, the reverberation time (RT60) varies over frequency and is in general longer for low frequencies, since they are not as easily absorbed when interacting with reflecting/absorbing boundaries. Due to the varying RT60 over frequency, sources may require different RIR filter lengths in terms of STFT frames for accurate modelling and projection. Within one broadband source occupying both relatively low and high frequencies, it may be useful to allow different RIR filter lengths for different frequencies. Typically, at high frequencies, the filter length is substantially shorter since signal energy is absorbed faster and no reverberation exists to be modelled using the RIR/projection.

Figure 2:
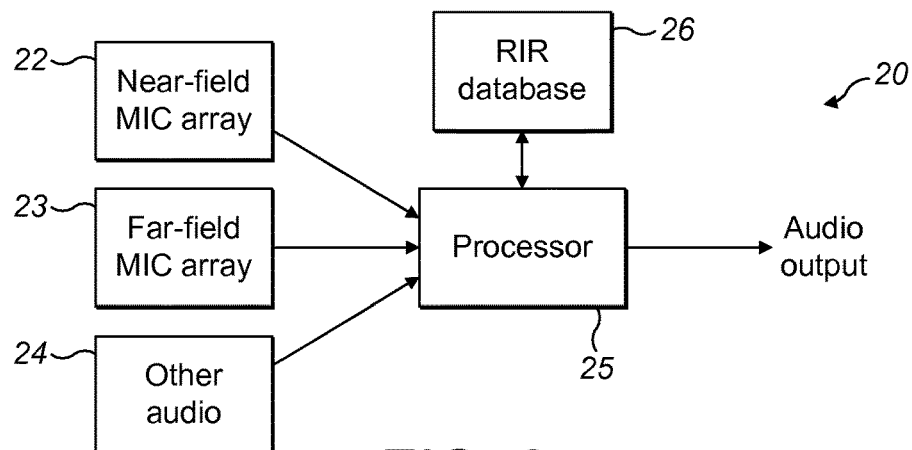
FIG. 2 is a block diagram of an audio processing system in accordance with an example embodiment.

FIG. 2 is a block diagram of an audio processing system, indicated generally by the reference numeral 20, in accordance with an example embodiment.

The system 20 comprises an array of near-field microphones 22 (similar to the microphones 4a to 4c described above), an array of far-field microphones 23 (similar to the microphone array 2 described above) and may include other audio sources 24 (such as the keyboard 8 and audio output system 9 described above). The system 20 also comprises a processor 25 and an RIR database 26. Audio signals from the audio sources 22, 23 and 24 are provided to the processor 25. The processor 25 implements an RIR filter in conjunction with an RIR database 26 and provides a suitably filtered audio output.

The following is a description of one way in which far-field audio signals may be processed to obtain a short-time Fourier transform (STFT). The far-field microphone array 23 comprising an array (e.g. spatial capture device with more than 3 microphones) composed of microphones with indexes ($c=1, \ldots, C$) captures a mixture $p=1, \ldots, P$ source signals $x^{(p)}(n)$ sampled at discrete time instances indexed by n and convolved with their room impulse responses (RIR). The sound sources are moving and have time-varying mixing properties, denoted by RIRs $h_{cn}^{(p)}(\tau)$, for each channel c at each time index n. Some of the sources (e.g. speaker, car, piano or any sound source) have lavalier microphones close to them. The resulting mixture signal can be given as:

$$y_c(n) = \sum_{p=1}^{P} \sum_{\tau} x^{(p)}(n-\tau) h_{cn}^{(p)}(\tau) + n_c(n) \qquad (1)$$

wherein:

$y_c(n)$ is the audio mixture in time domain for each channel index c of the far-field audio recording device 2, i.e. the signal received at each far-field microphone;

$x^{(p)}$ is the $p^{th}$ near-field source signal in time domain (source index p);

$h_{cn}^{(p)}(\tau)$ is the partial impulse response in time domain (sample delay index $\tau$), i.e. the room impulse response;

$n_c(n)$ is the noise signal in time domain.

Applying the short time Fourier transform (STFT) to the time-domain array signal allows expressing the capture in time-frequency domain as:

$$y_{ft} = \sum_{p=1}^{P} \sum_{d=0}^{D-1} h_{ftd}^{(p)} x_{ft-d}^{(p)} + n_{ft} = \sum_{p=1}^{P} \hat{x}_{ft}^{(p)} + n_{ft} \qquad (2)$$

wherein:

$y_{ft}$ is the STFT of the array mixture (frequency and frame index f,t);

$x_{ft}^{(p)}$ is the STFT of pth near-field source signal (p);

$h_{ftd}^{(p)}$ is the room impulse response (RIR) in STFT domain (frame delay index d);

$\hat{x}_{ft}^{(p)}$ is the STFT of pth reverberated (filtered/projected) source signal;

$n_{ft}$ is the STFT of the noise signal.

The STFT of the array signal is denoted by $y_{ft} = [y_{ft1}, \ldots, y_{ftC}]^T$ where f and t are frequency and time frame index, respectively. The source signal as captured by the array is modeled by convolution between the source STFT $x_{ft}^{(p)}$ and its frequency domain RIR $h_{ftd}^{(p)} = [h_{ftd1}, \ldots, h_{ftdC}]^T$. The length of the convolutive frequency domain RIR is D frames which can vary from few frames to several tens of frames depending on the STFT window length and maximum effective amount of reverberation components in the environment. Please note that this model differs greatly from the usual assumption of instantaneous mixing in frequency domain with mixing consisting of complex valued weights only for the current frame. The additive uncorrelated noise is denoted by $n_{ft} = [n_{ft1}, \ldots, n_{ftC}]^T$. The reverberated source signals are denoted by $\hat{x}_{ft}^{(p)}$.

Figure 3:
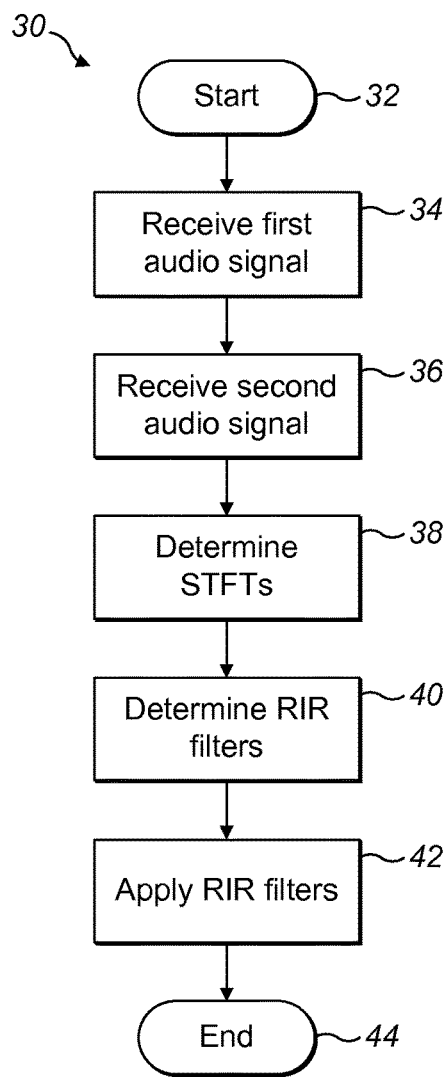
FIG. 3 is a flow chart showing algorithm in accordance with an example embodiment.

FIG. 3 is a flow chart showing an algorithm, indicated generally by the reference numeral 30, in accordance with example embodiment. The algorithm 30 provides an example arrangement for obtaining RIR filter parameters in accordance with various embodiments. The algorithm 30 starts at operation 32.

At operation 34, an audio signal $y_c(n)$ is received from the far-field microphone array 23. At operation 36 an audio signal $x^{(p)}(n)$ is received from the near-field audio microphone array 22 for those sound sources provided with a near-field audio recording device (such as the devices 4a, 4b and 4c described above).

During operation 36, the location of a relevant mobile source may be determined. The location can be determined using information received from a tag with which the mobile source is provided. Alternatively, the location may be calculated using multilateration techniques described below.

At operation 38, a short-time Fourier transform (STFT) is applied to both far-field and near-field audio signals. Alternative transforms may be applied to the audio signals as described below.

In some embodiments, time differences between the near-field and far-field audio signals can be taken into account. However, if the time differences are large (e.g. several hundreds of milliseconds or more) a rough alignment may be carried our prior to the process commencing. For example, if a wireless connection between a near-field microphone and RIR processor causes a delay, the delay may be manually fixed by delaying the other signals in the RIR processor or by an external delay processor which may be implemented as hardware or software.

A signal activity detection (SAD) may be estimated from the near-field signal in order to determine when the RIR estimate is to be updated. For example, if a source does not emit any signal over a time period, its RIR value does not need to be estimated.

At operation 40, RIR filter values are determined (or estimated). The STFT values $y_{ft}$ and $x_{ft}^{(p)}$ are input to an RIR estimator module that may form part of the processor 25. The RIR estimation may be performed using a block-wise linear least squares (LS) projection in offline operation mode, that is where the RIR estimation is performed as part of a calibration operation. Alternatively, a recursive least squares (RLS) algorithm for real time operation mode, that is where the RIR estimation occurs during a performance itself. In other embodiments, the RLS algorithm may be used in offline operation instead of the block-wise linear LS algorithm. In any case, as a result, a set of RIR filters in time-frequency domain are obtained.

As described further below, the RIR filter values determined in operation 40 may be used in operation 42. The algorithm 30 ends at operation 44.

FIG. 4 is a block diagram of an audio processing system, indicated generally by the reference numeral 50, in accordance with an example embodiment.

The system 50 comprises an array of near-field microphones 52 (similar to the array 22 described above), an array of far-field microphones 53 (similar to the array 23 described above). The outputs of the array 52 and array 53 are provided to a pre-processing module 54 (which may be optional). The output of the pre-processing module is provided to a filter-length estimation module 55 and to an RLS processing module 56. The pre-processing module 54, filter-length estimation module 55 and RLS processing module 56 may be implemented by the processor 25 of the system 20 described above.

The filter length estimation module 55 determines an appropriate length for the room impulse response (RIR) filter for the audio data from the array of near-field microphones 52 and may form part of the operation 40 of the algorithm 30 described above. As described in detail below, RIR filters may comprise a first portion that includes a direct acoustic propagation delay and a second portion that is frequency-dependent.

The RLS processing module 56 processes the audio data, including filtering using an RIR filter.

FIG. 5 is a flow chart showing algorithm, indicated generally by the reference numeral 6o, in accordance with example embodiment. The algorithm 60 may be implemented by the system 50 described above.

As shown in FIG. 5, a first audio signal is received in operation 62, a second audio signal is received in operation 64 and a filter length is determined in operation 66. By way of example, the first and second audio signals may be received from the arrays 52 and 53 described above respectively. The filter length may be determined by the filter length estimation module 55.

FIG. 6 is a flow chart showing algorithm, indicated generally by the reference numeral 70, in accordance with example embodiment. The algorithm 70 shows an example implementation of the operation 66 in which a first portion of the filter length is determined in operation 72 and a second portion of the filter length is determined in operation 74. The first portion of the relevant RIR filter may have a length dependent (at least in part) on a direct acoustic propagation delay and the second portion of the RIR filter may have a length that is frequency-dependent.

Example implementations of the system 50 and the algorithms 60 and 70 are provided below by way of example.

Figure 7:
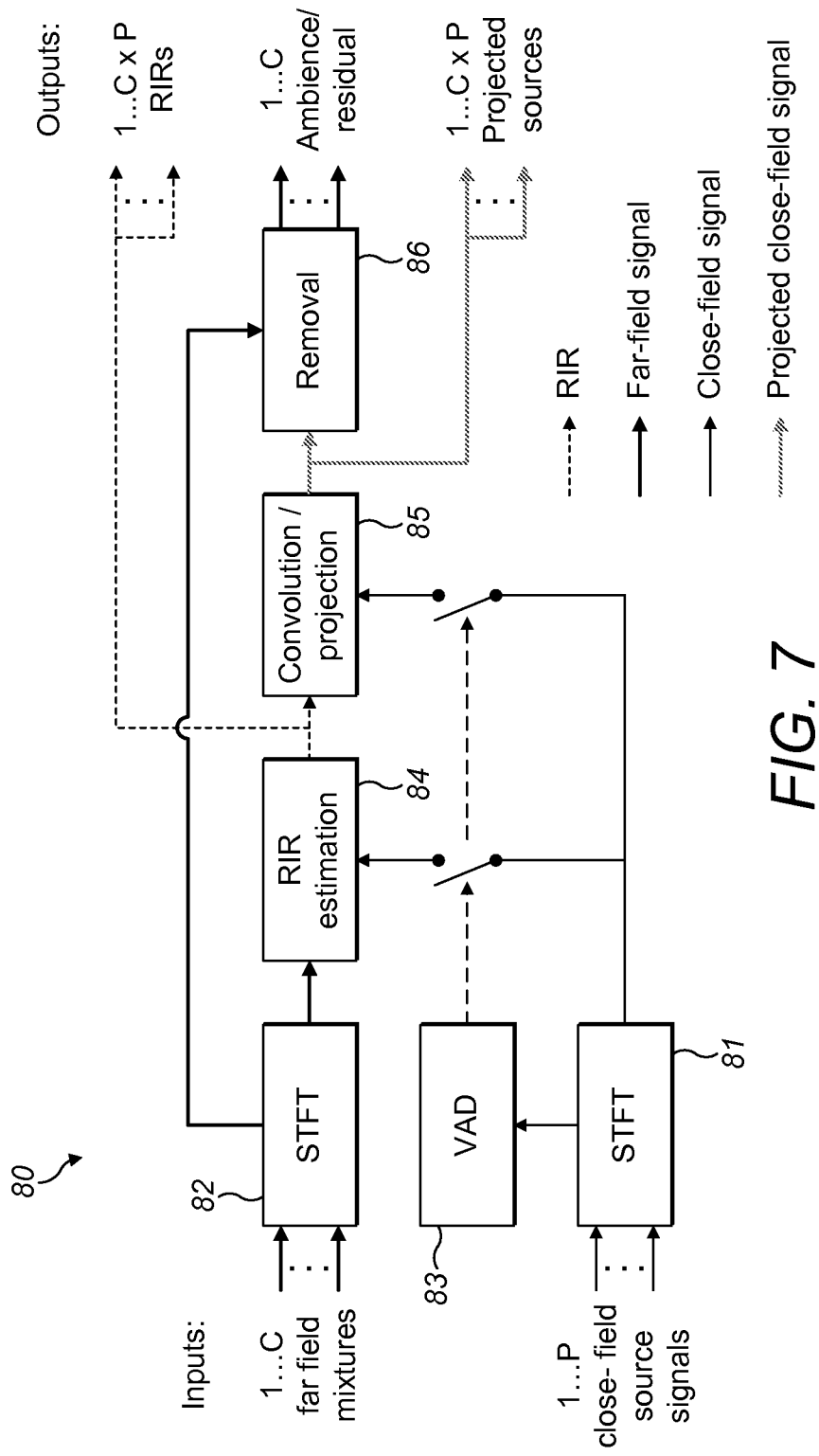
FIG. 7 is a block diagram of a system in accordance with an example embodiment.

FIG. 7 is a block diagram, of a system, indicated generally by the reference numeral 8o, in accordance with an example embodiment. The system 80 comprises a first STFT module 81, a second STFT module 82, a voice activity detection (VAD) module 83 (or signal activity detection (SAD)), an RIR estimation module 84, a convolution/projection module 85 and a removal module 86.

As shown in FIG. 7, the first STFT module 81 receives inputs from close-field source capture(s) $x^{(p)}(n)$, e.g. those sources that have Lavalier microphones and the second STFT module 82 receives input from far field array signal(s) $y_c(n)$ e.g. OZO microphone signals (or of course any relevant array microphone signals). Thus, the first and second STFT modules 81 and 82 implement the operations 62 and 64 of the algorithm 60 described above.

The system 80 can account for some time differences between the close-field (LAV) and far-field (OZO) signals, however, if the differences are large (e.g. several hundreds of milliseconds or more) a rough alignment may be implemented.

The VAD or SAD module 83 receives signals from the close-field signal in order to determine when the RIR estimate is to be updated (by the RIR estimation module 84), i.e., if a source does not emit any signal its RIR is not estimated. Both STFTs $y_{ft}$ and $x_{ft}^{(p)}$ are inputs to an RIR estimation module 84 by recursive least squares (RLS) algorithm for real time operation mode (discussed further below).

The RIRs estimated are convolutive in the STFT domain, i.e. the filter coefficients span over several STFT frames and RIR for each frequency index is estimated individually (by convolution/projection module 85). This strategy makes the individual filters to consist of only several tens of coefficients making their estimation more robust, while when combined by inverse STFT the filters span several hundreds of milliseconds. This may be provided to accurately model sound propagation in environments with reverberation times up to several seconds. The estimation criterion is formulated as least squares criterion of the residual after removing the filtered sources (using the removal module 86) from the mixture. The mathematical formulation can be interpreted as projecting the close-field signal to far-field signal space, hence the term projection is used (see module 85) to describe the entire process hereafter. As a result, a set of RIR filters in STFT domain are obtained. As a result, a set of RIR filters in time-frequency domain are obtained.

The obtained RIR may be applied to the original close-field signal (as discussed above with reference to FIG. 2). After applying the RIR the close-field signal can finally be added or subtracted (either in time or in time-frequency domain) to/from the array signal(s). In this way the influence of the sources can be increased or decreased/removed in the mixture signal to produce the ambience/residual signal. Additionally, the estimated RIRs are outputted for subsequent processing steps, such as parametrization of the RIRs for tasks of changing listening position (e.g. in 6DoF audio) or encoding of the RIRs for transmission.

Online RIR Estimation by RLS Algorithm

In real time operation the filter weights vary for each time frame t and we assume availability of $p=1, \ldots, \hat{P}$ close-field source signals ($\hat{P} \leq P$). Assuming that the mixing model in equation (2) is uncorrelated across frequencies then the RIR weights can be estimated independently for each frequency. By omitting the channel dimension (process repeated independently for all channels), the filtering equation for the $\hat{P}$ known signals in time frame t and at frequency index f is specified as $$\hat{x}_{ft} = \sum_{p=1}^{\hat{P}} \sum_{d=0}^{D-1} x_{ft-d}^{(p)} h_{ftd}^{(p)} = x_{ft}^T h_{ft} \quad (3)$$

The vector variables $x_{ft}^T \in \mathbb{C}^{\hat{P}D \times 1}$ and $h_{ft} \in \mathbb{C}^{\hat{P}D \times 1}$ contain the source signals and filter coefficients as stacked and can be specified as, $$x_{ft} = [x_{ft}^{(1)}, x_{ft-1}^{(1)}, \ldots, x_{ft-D-1}^{(1)}, \ldots, x_{ft}^{(\hat{P})}, x_{ft-1}^{(\hat{P})}, \ldots, x_{ft-D-1}^{(\hat{P})}]^T,$$

and for the filter coefficients as, $$h_{ft} = [h_{ft0}^{(1)}, h_{ft1}^{(1)}, \ldots, h_{ftD-1}^{(1)}, \ldots, h_{ft0}^{(\hat{P})}, h_{ft1}^{(\hat{P})}, \ldots, h_{ftD-1}^{(\hat{P})}]^T.$$

For notational simplicity and since the RIR estimation by RLS algorithm is applied individually for all frequencies, we omit the frequency index f during following explanation of the general RLS algorithm. Efficient real-time operation can be achieved with recursive estimation of the RIR filter weights $h_t$ using the recursive least squares (RLS) algorithm. The modelling error at time step t is specified as:

$$e_t = y_t - \hat{x}_t \quad (4)$$

where $y_t$ is the observed/desired mixture signal. The cost function to be minimized with respect to filter weights is:

$$C(h_t) = \sum_{i=0}^{t} \lambda^{t-i} e_i^2, 0 < \lambda < 1 \quad (5)$$

which accumulates the estimation error from past frames with exponential weight $\lambda^{t-i}$. The weight of the cost function can be thought of as a forgetting factor which determines how much past frames contribute to the estimation of the filter weights at current frame. In literature RLS with $\lambda<1$ is sometimes called to as exponentially weighted RLS and when $\lambda=1$ it is referred to as growing window RLS.

The RLS algorithm minimizing equation (5) is based on recursive estimation of the inverse correlation matrix $P_t$ of the close-field signal and the optimal filter weights $h_t$ and can be summarized as:

Initialization:

$h_0 = 0$ $P_0 = \delta^{-1} I$

Repeat for t=1, 2, . . .

$$\alpha_t = y_t - x_t^T h_{t-1} \tag{6}$$

$$g_t = P_{t-1} x_t^* \frac{1}{\lambda + x_t^T P_{t-1} x_t^*}$$

$$P_t = \frac{1}{\lambda P_{t-1}} - \frac{1}{\lambda g_t x_t^T P_{t-1}}$$

$$h_t = h_{t-1} + \alpha_t g_t$$

The initial regularization of the inverse autocorrelation matrix is achieved by defining δ using a small positive constant, typically from $10^{-2}$ to $10^1$. Small δ causes faster convergence whereas larger δ constraints the initial converge to happen over longer time period (few seconds).

With the above definitions the standard RLS algorithm can be used to jointly estimate all close-field signal RIRs simultaneously, which greatly improves the estimation accuracy by preventing overfitting and using all available information of the sources.

The contribution of past frames to the RIR filter estimate at current frame t can be varied over frequency f. Small changes in source position can cause substantial changes in the RIRs at high frequencies due to highly reflected and more diffuse sound propagation path, and therefore the contribution of past frames at high frequencies may be lower than compared to low frequencies. It is assumed that the RIR parameters slowly change at lower frequencies and source evidence can be integrated over longer periods, meaning that the exponential weight $\lambda^{t-i}$ can have substantial values for frames up to 1.5 seconds in past. In contrast, past frames only up to 0.5 or 0.8 seconds can be reliably used to update the filter weights at high frequencies, and the error weight should be close to zero for frames older than that.

Figure 8:
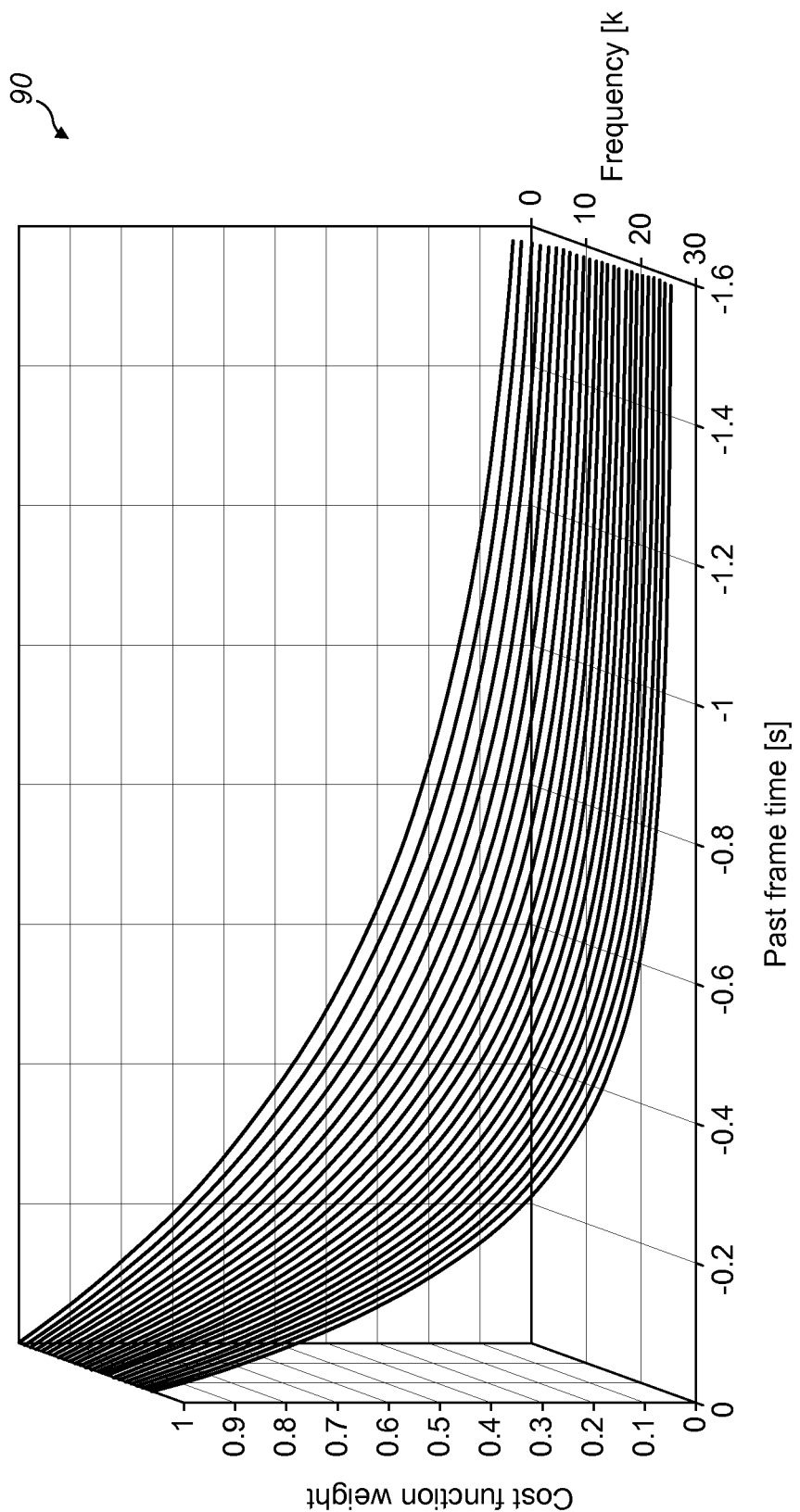
FIG. 8 is a graph in accordance with an example embodiment.

FIG. 8 is a graph, indicated generally by the reference numeral 90, showing example variables of an RLS cost function in accordance with an example embodiment. Typical exponential weights are depicted in FIG. 8 and their numerical values corresponds to 0.98 for f=1 (=0 Hz) linearly decreasing to 0.95 for f=F (=24 kHz). Typical decay curves are shown in FIG. 8.

Regularized RLS Algorithm

A regularized RLS algorithm can be used to improve the robustness of RIR estimation, as described further above. In order to specify regularization of the RIR filter estimates, the RLS algorithm is given in a direct form, i.e. without using matrix inversion lemma to derive update directly to the inverse autocorrelation matrix $P_t$ but for the autocorrelation matrix $R_t$ ($R_t^{-1} = P_t$). The formulation can be found for example from T. van Waterschoot, G. Rombouts, and M. Moonen, "Optimally regularized recursive least squares for acoustic echo cancellation," in Proceedings of The second annual IEEE BENELUX/DSP Valley Processing Symposium (SPS-DARTS 2006), Antwerp, Belgium, 2005, pp. 28-29. The direct form RLS algorithm updates are specified as:

Initialization:

$h_0 = 0$ $R_0 = \delta^{-1} I$

Repeat for t=1, 2, . . .

$\alpha_t = y_t - x_t^T h_{t-1}$ $R_t = \lambda R_{t-1} + x_t^* x_t^T$ $$h_t = h_{t-1} + R_t^{-1} x_t^* \alpha_t \tag{7}$$

The above algorithm would give the exact same result as the one described above, but requires operation for calculating the inverse of the autocorrelation matrix, and is thus computationally more expensive, but in return allows regularization of it.

The autocorrelation matrix update with Levenberg-Marquardt regularization (LMR), as described in T. van Waterschoot, G. Rombouts, and M. Moonen, "Optimally regularized recursive least squares for acoustic echo cancellation," in Proceedings of The second annual IEEE BENELUX/DSP Valley Processing Symposium (SPS-DARTS 2006), Antwerp, Belgium, 2005, pp. 28-29. according to [3] is:

$$R_t = \lambda R_{t-1} + x_t^* x_t^T + (1-\lambda) \text{diag}(b_t) I, \tag{8}$$

where diag($b_t$) denotes diagonal matrix with vector $b_t$ on its main diagonal. The regularization weights $b_t \mathbb{R}^{\hat{P}\hat{D} \times 1}$ are defined as, $$b_t = \left[ \underbrace{b_t^{(1)}, \ldots, b_t^{(1)}}_{D}, \ldots, \underbrace{b_t^{(\hat{P})}, \ldots, b_t^{(\hat{P})}}_{D} \right]^T, \tag{9}$$

Another type of regulation type of regularization is the Tikhonov regularization (TR), corresponding to $L_2$ regularization in regular Least Squares formulation, which can defined for the RLS algorithm as described in João F. Santos and Tiago H. Falk, "Blind room acoustics characterization using recurrent neural networks and modulation spectrum dynamics," AES 60TH INTERNATIONAL CONFERENCE, 2016:

$$R_t = \lambda R_{t-1} + x_t^* x_t^T + (1-\lambda) \text{diag}(b_t) I \tag{10}$$

$$h_t = h_{t-1} + R_t^{-1} (x_t^* \alpha_t + (1-\lambda) \text{diag}(b_t) h_{t-1}) \tag{11}$$

Example Implementation of the RLS Regularization

The regularization of the filter update in RLS algorithm allows improving RIR estimation robustness from numerous perspectives. Firstly, the regularization can be used to avoid general overfitting by penalizing and regularizing excess filter weights by estimating average RMS level difference in the source close-field signal and far-field mixture. Secondly, regularization can be used in avoiding projecting cross-talk signal components present in the close-field microphones, especially in low frequencies. The close-field microphones are generally not directive at low frequencies and can pick up low-frequency signal content from noise or other sources. Additionally, since the RIR estimation of multiple sources is formulated as a joint optimization problem, there is need to control the update of specific elements $h_{ft,d}^{(p)}$ within $h_{ft}$ in case of momentary or long period of silence of subset of sources.

Figure 9:
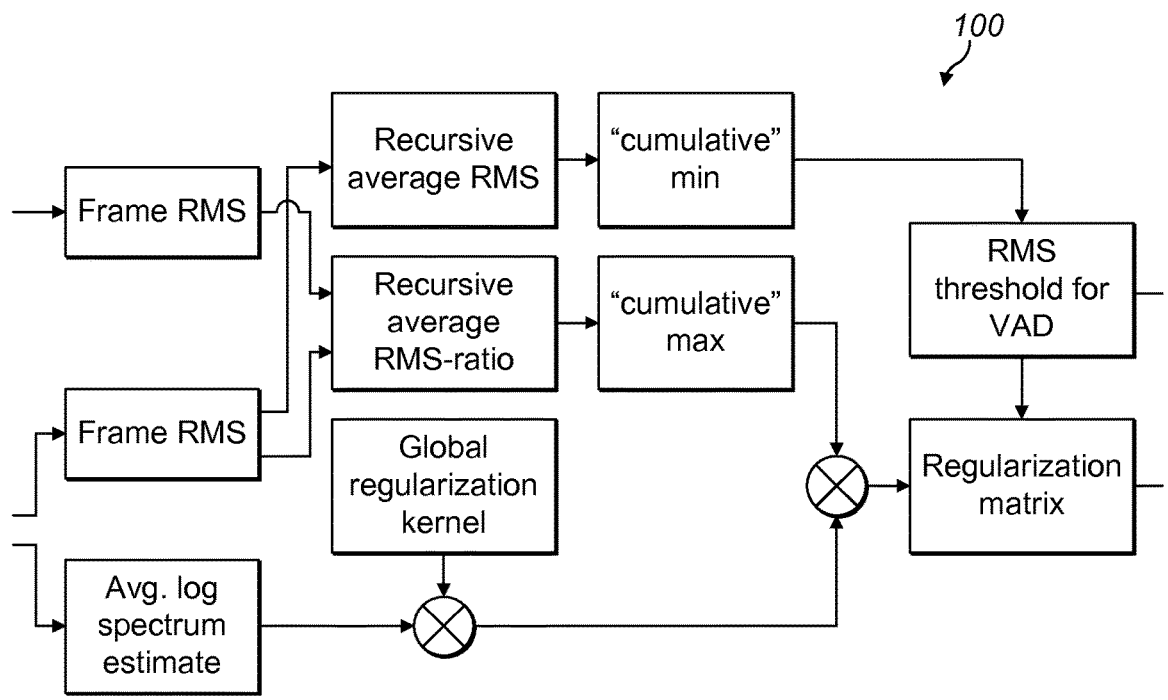
FIG. 9 is a block diagram of a system in accordance with an example embodiment.

FIG. 9 is a block diagram of a system, indicated generally by the reference numeral 100, of an exemplary implementation of the pre-processing module 54 of the system 50 described above. The system 100 is provided for controlling regularization, source activity detection and routing of the pre-processing module 54. In the following sections, we will break down the frequency dependent regularization weights $$b_{ft} = \left[ \underbrace{b_{ft}^{(1)}, \ldots b_{ft}^{(1)}}_{D}, \ldots, \underbrace{b_{ft}^{(\hat{P})}, \ldots, b_{ft}^{(\hat{P})}}_{D} \right]^T, \quad (12)$$

into a signal RMS level dependent part $a_t^{(p)}$, a close-field relative spectrum dependent part $c_{ft}^{(p)}$ and global regularization constant $\sigma$ so that $b_{ft}^{(p)} = \sigma\, a_t^{(p)}\, c_{ft}^{(p)}$.

Signal RMS Level-Based Regularization

First the frame RMS of the input signal STFTs is calculated as:

$$RMS[x_f] = \left( \frac{1}{F} \sum_f |x_f|^2 \right)^{1/2}.$$

The amount of regularization needed is dependent on how much attenuation or amplification on average is required between close-field and far-field signals. For this we use overall signal RMS level ratio between the close-field signal $x_{ft}^{(p)}$, and the far-field signal $y_{ft}$ (for a single channel c) estimated recursively as, $$L_t^{(p)} = \gamma L_{t-1}^{(p)} + (1-\gamma) RMS[x_{ft}^{(p)}]/RMS[y_{ft}] \quad (13)$$

where $\gamma$ controls the amount of recursion, i.e. that the RMS estimate does not react too fast for rapid changes in RMS ratio. We store the maximum observed value of $L_t^{(p)}$ since from the start of the processing denoted as $L_{max}^{(p)} = \max_{0 < t' < t} [L_{t'}^{(p)}]$. The amount of regularization is set to $a_t^{(p)} = L_{max}^{(p)}$ which denotes maximum observed RMS ratio. For example, if $L_t^{(p)} = 1$ (0 dB) it indicates that the signals have same overall RMS level.

Relative Spectrum Based Regularization

The close-field signal $x_{ft}^{(p)}$ can have very low energy at certain frequencies and practically no evidence of it can be observed in the mixture $y_{ft}$. This applies especially to musical instruments. Additionally, the close-field signal might have some cross-talk component particularly in low-frequencies that can become projected with high filter gains if the relative spectrum of the source is not taken into account in the regularization.

In order to avoid updating the filter coefficients with relatively weak energy, we use a source spectrum based regularization. We keep short-term average statistics of the close-field signal magnitude spectrum $m_{ft}^{(p)} = \sum_{t'=t-M}^{t} |x_{ft}^{(p)}|$, where M denotes the number of averaged frames. The spectrum based regularization given current processed frequency f is defined as $$c_{ft}^{(p)} = 1 - \log 10(m_{ft}^{(p)}/\max_f [m_{ft}^{(p)}]) \quad (14)$$

The frequency index with most energy in the short-term average spectrum results to $c_{ft}^{(p)} = 1$ whereas frequencies with lower energy have $c_{ft}^{(p)} > 1$ in logarithmic relation. The developed relative spectrum based regularization is effective avoiding projecting possible cross-talked content with low energy with respect to actual signal components. Additionally, the low-frequency cross-talk projection is restricted by the global regularization constant $\sigma$ which is set so that it increases towards low frequencies in logarithmic relation and in general low frequency signal components will in general have larger regularization.

Source Activity Detection

For the source activity detection we calculate recursively smoothed estimate of the RMS level of the close-field signals calculated as $$\hat{L}_t^{(p)} = \gamma \hat{L}_{t-1}^{(p)} + (1-\gamma) RMS[x_{ft}^{(p)}] \quad (15)$$

We store the minimum RMS value observed as from the beginning of processing ($\hat{L}_{max}^{(p)} = \min_{0 < t' < t} [\hat{L}_{t'}^{(p)}]$) which acts as noise floor estimate for each close-field microphone, assuming that source is momentarily silent. We use 3 dB detection threshold above the noise floor ($2*\hat{L}$) to set the source active.

The activity information is used to either pass on the regularization without modification or in order to avoid updating RIR of inactive source p at time step t the respective regularization weights regularization is set to very high, for example, $b_{ft}^{(p)} = 100\, a_t^{(p)}\, c_{ft}^{(p)}$. This effectively halts the update of the filter weights when the second term in Equation (8) is very large and the inverse of $R_t$ end up having very small effect in filter weights update in (7) leading to $h_{ft} \approx h_{ft-1}$.

Filtering Operation and Implementation Parameters

The RLS algorithm may be applied independently for all frequencies of the input STFTs to obtain $h_{ftd}^{(p)}$ and the reverberated sources can be obtained as, $$\hat{x}_{ft}^{(p)} = \sum_{d=0}^{D-1} x_{ft-d}^{(p)} h_{ftd}^{(p)}, \; p \in [1, \ldots, \hat{P}] \quad (16)$$

Time-domain signals can be reconstructed by inverse FFT and overlap-add synthesis. The modifications of the mixture signal using the reverberated sources is linear additive operation and can be done in either STFT or time-domain.

Typical implementation parameters with STFT window length set to 1024 samples with 50% frame overlap are as follows. The forgetting factor was set to $\lambda=0.98$ for 0 Hz and it linearly decreases to 0.95 for Fs/2=24 kHz. The chosen values correspond to error accumulation extending to past 1.5 seconds for 0 Hz and past 0.8 seconds for 24 kHz. Recursion factor for RMS level ratio was set to $\gamma=0.97$ and the global regularization constant $\sigma=10-4$. If the source is inactive regularization is set as $b_{ft}^{(p)} = 100\, a_t^{(p)}\, c_{ft}^{(p)}$. It is understood that different values can be used.

Automatic Filter Length Detection

As described above, the RIR estimation by RLS algorithm may use different filter lengths for different frequencies, which can be determined based on the RT60 of the recording environment and frequency content of the sources. However, the acoustic propagation delay from source to receiver is not considered by the RT60 which is assumed to be approximately uniform in all positions within the room.

In one embodiment described herein, it is proposed herein that the minimum RIR filter length is determined based on the initial delay (acoustic propagation delay and hardware/software delay) estimated based on the magnitude envelope of RIRs from previous frames. The RIR can be varied individually for different close-field captured sources and it can vary over time considering cases where the source is closer or farther away from the capturing device.

Figure 10:
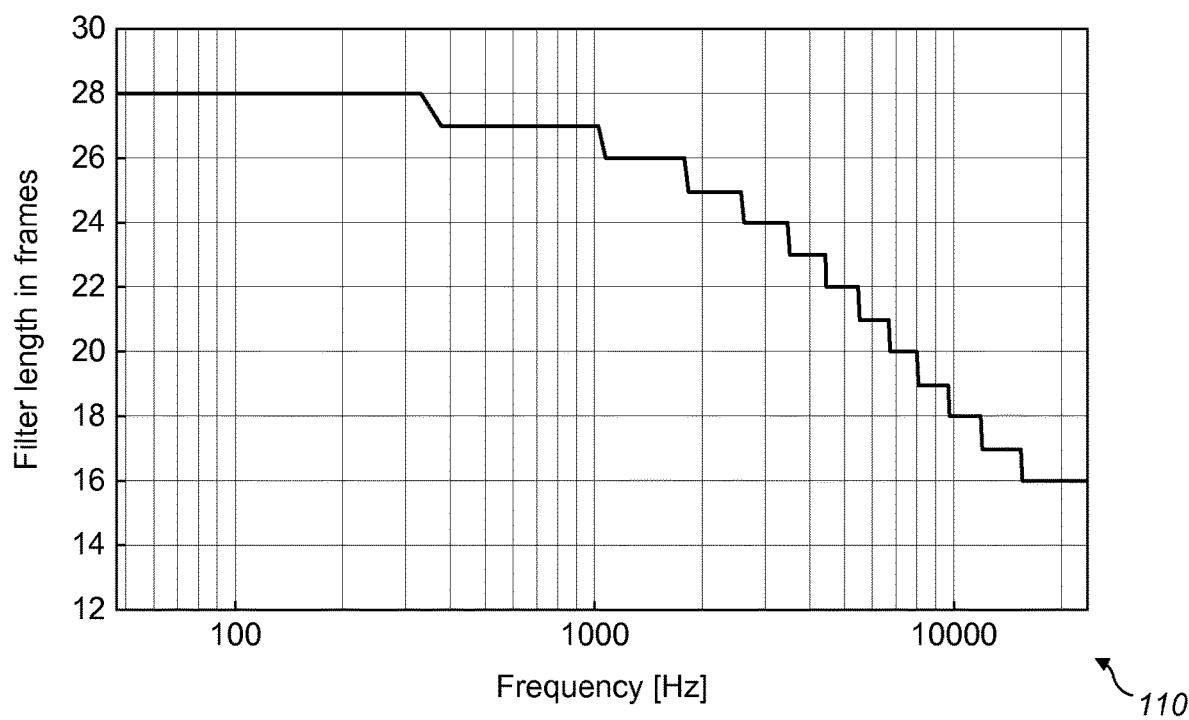
FIG. 10 is a graph showing RIR filter length adjusted according to frequency in accordance with an example embodiment.

FIG. 10 is a graph, indicated generally by the reference numeral 110, showing RIR filter length adjusted according to frequency in accordance with an example embodiment. In FIG. 10, the RIR filter length ($D_{pf}$) is adjusted according to the frequency. Here at the lowest frequencies maximum RIR filter length $D_{max}=28$ blocks is used. The filter length $L_{ft}$ is 1024 samples. Since there is overlap of 50%, the total RIR filter length is 512×28 samples, i.e. approximately 300 ms when sampling frequency is 48 kHz. At the Nyquist frequency the filter length is set to $L_{min}=16$ blocks, i.e. ~170 ms.

RIR Magnitude Envelope and Initial Delay Estimation

By denoting the RIR filter lengths for different sources p at different frequencies f by $D_{pf}$ we can write the filtering equation as:

$$\hat{x}_{ft} = \sum_{p=1}^{\hat{P}} \sum_{d=0}^{D-1} x_{ft-d}^{(p)} h_{ftd}^{(p)} = x_{ft}^T h_{ft} \quad (17)$$

The RIR filter lengths $D_{pf}$ for optimal subjective projection quality can be automatically estimated based on the reverberation time of the environment and the initial time delay the sound wave is required to travel from its origin to the far-field observer. For the initial delay compensation we propose to use direct-path delay estimation based on analysis of the RIR magnitude envelope. The RIR lengths are first initialized with sufficiently long filters used for the few first seconds from the beginning or operation. After initial convergence of the RIR filters (1-5 seconds of operation) and assuming sources being active in that time region, we calculate the energy envelope of estimated RIRs (in STFT domain) and the frame with maximum energy is assumed to contain the direct path information of the source. The RIR filter length is truncated or appended to correspond to the updated direct path delay estimate added with the amount of frames required to model the reverberation in the current operation environment (typically the length specified in FIG. 10).

The magnitude envelope is calculated as, $$z_{dt}^{(p)} = \sum_{f=1}^{F} m_{ft}^{(p)} |h_{ftd}^{(p)}| \quad (18)$$

where $m_{ft}^{(p)}$ is the short-term average spectrum of the source p as specified above and it weights the reliable frequency indices of $h_{ftd}^{(p)}$ for the envelope calculation. For the direct-path delay estimation, a maximum value from $z_{dt}^{(p)}$ over dimension d is searched in each time frame and its index is denoted by $\hat{d}_t^{(p)}$.

The direct-path delay estimates $\hat{d}_t^{(p)}$ are stored from previous frames with time span of approximately booms (M=94 frames with 1024/512 STFT) and final estimate of the initial delay is formed by mean or median filtering specified as $$\hat{d}_{t,filt}^{(p)} = \langle \hat{d}_{t'}^{(p)} |_{t'=t-M+1 \ldots t} \rangle \quad (19)$$

where $\langle \ldots \rangle$ denotes mean or median filtering and considering only time frames t where the source p was determined active by source activity detection in 4.3.

Figure 11:
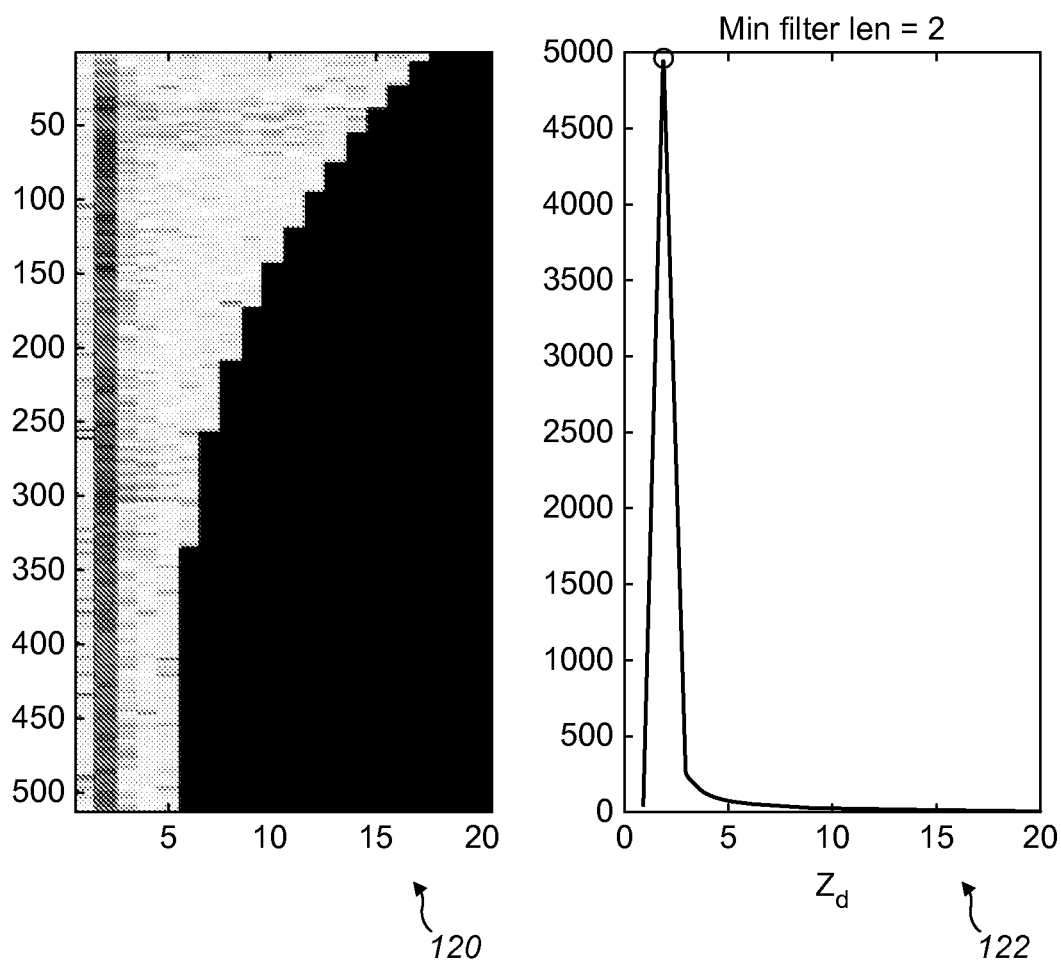
FIG. 11 shows RIR values and a corresponding magnitude envelope in an example embodiment.
Figure 12B:
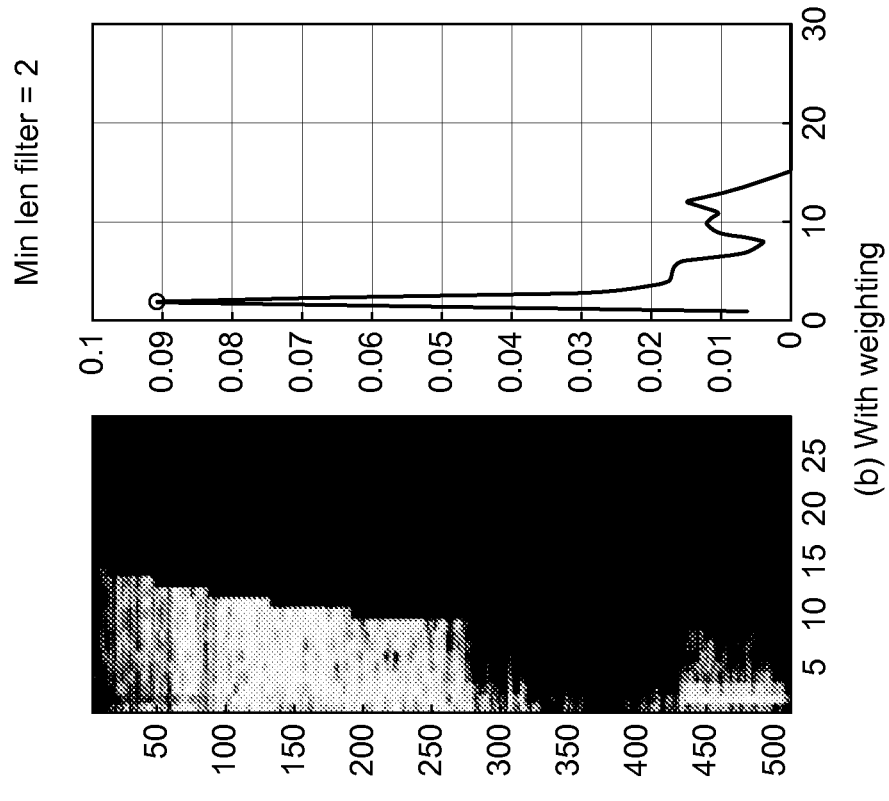
FIGS. 12A and 12B shows RIR values and a corresponding magnitude envelope in an example embodiment without spectrum weighting (FIG. 12A) and with spectrum weighting (FIG. 12B)
Figure 12A:
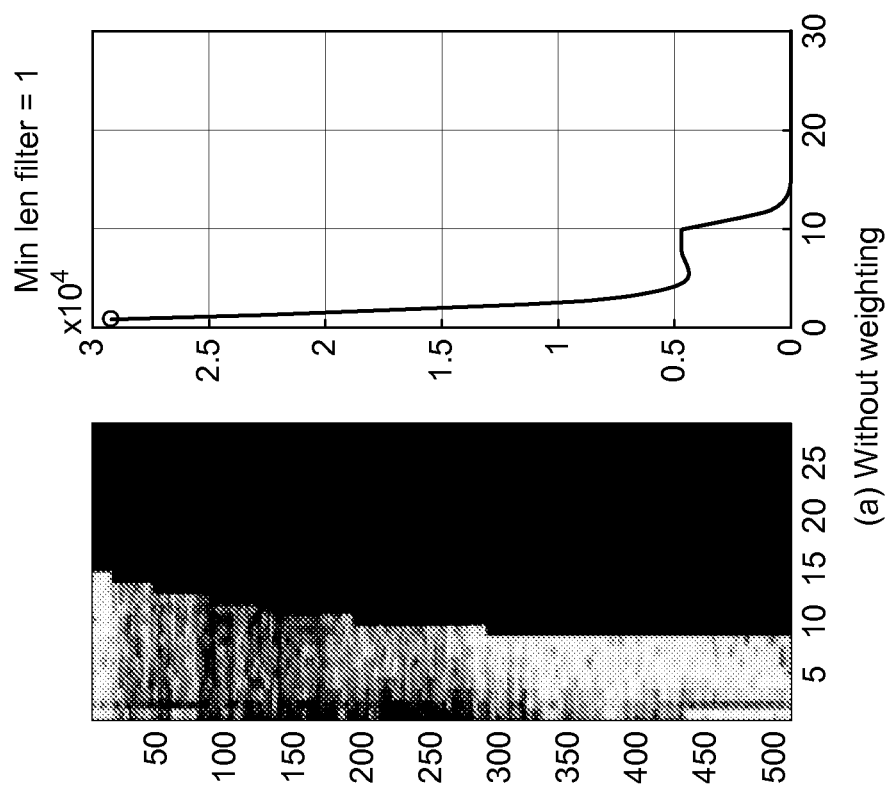

FIG. 11 shows RIR values 120 and a corresponding magnitude envelope 122 of a speech sources calculated using Equation 16. FIG. 12 shows RIR values and corresponding magnitude for a guitar source in which FIG. 12A shows the values without spectrum weighting and FIG. 12B shows the values with spectrum weighting.

The short-term average spectrum weighting of the magnitude envelope is especially important with sources having sparse spectrum (for example harmonic instruments, such as a guitar) and the effect of the weighting is illustrated in FIG. 12 indicating that without the weighting the direct path estimate is erroneously identified to be in first frame instead of the true value corresponding to second frame.

In the case of very fast moving sources and potentially long filter lengths may cause problems in audio quality. With fast moving sources, shorter than estimated filter lengths can be used to compensate the motion.

RIR Filter Length Change Strategy

The RIR filter length may change over time. Thus, for example, the means for determining a filter length of the RIR filter may be adaptive. As described elsewhere, the first portion of the RIR filter may be dominated by a direct distance between a near-field audio microphone and a far-field audio microphone. This distance may vary over time (e.g. with configuration changes, such as in the event that a person wearing a close-microphone moves on stage).

The initial delay estimate in Equation (19) is used in combination with frequency dependent RIR lengths $D_{pf}$ in such way that initial delay sets the minimum RIR length and the prior measured or blindly estimated RT60 over frequency bands determines the effective length of the RIR modelling the room/environment reverberation. For example, the algorithm 70 described above includes an RIR filter having a first portion having a length dependent (at least in part) on a direct acoustic propagation delay and the second portion having a length that is frequency-dependent.

The length of the STFT domain RIR can vary from few frames to several tens of frames, for example a r=10 meter distance between close and far-field microphones results to $\tau_{dir}$=29 ms direct path delay ($\tau_{dir}$=r v, where v=345 m/s is the speed of sound). Assuming STFT window size of N=1024 samples with 50% overlap, the direct path peak occurs at frame $$\hat{d}_{dir} = \tau_{dir} F_s / \left(\frac{N}{2}\right) = 2.7.$$

If we want to model $\tau_{rev}$ ms of reverberation after the direct path, we need to use $$\hat{D}_{pf} = D_{pf} + \tau_{rev,f} F_s / \left(\frac{N}{2}\right)$$

amount of frames for the RIRs $h_{ftd}^{(p)}$. The RT60 $\tau_{rev,f}$ over frequency f is assumed to be known in advance.

In order to avoid rapidly switching between two initial delay frame estimates, a minimum change period (e.g. of the order of booms) may be forced. If the RIR filter initial delay was changed within the last booms, then even if $\hat{d}_{t,filt}^{(p)}$ indicates different initial delay than the current one, the change is not applied. If the initial delay change is permitted (i.e. no previous change within booms) and $\hat{d}_{t,filt}^{(p)}$ indicates different initial delay from current one, then the new RIR filter lengths are set as $\hat{D}_{pf}=\hat{d}_t^{(p)}+D_{pf}$ where $D_{pf}$ denotes the fixed RIR filter lengths relative to the reverberation time of the environment and assumed to be preset by using for example lengths specified in FIG. 10.

If the new RIR length is greater than its previous value, the current filter estimate $h_{ftd}^{(p)}$ is appended with zeros and the new indices in the covariance matrix $R_t$ are initialized with small values on the diagonal only (same initial values as in the beginning of the algorithm, i.e. $\delta^{-1}I$). Note that in case of more than one source ($\hat{P}>1$), the stacked form of the RIR filters, i.e. $h_t=[h_{t0}^{(1)}, h_{t1}^{(1)}, \ldots, h_{tD-1}^{(1)}, \ldots, h_{t0}^{(\hat{P})},$ $h_{t1}^{(P)}, \ldots h_{tD-1}^{(P)}]^T$ zeros may be appended inside/between the vector indices. Same applies to the stacked covariance matrix $R_t$. In case of decreasing the RIR filter length then only valid indices from current estimate $h_{ftd}^{(p)}$ and the covariance matrix $R_t$ are kept, i.e. the RIRs are truncated to a shorter length.

Figure 13:
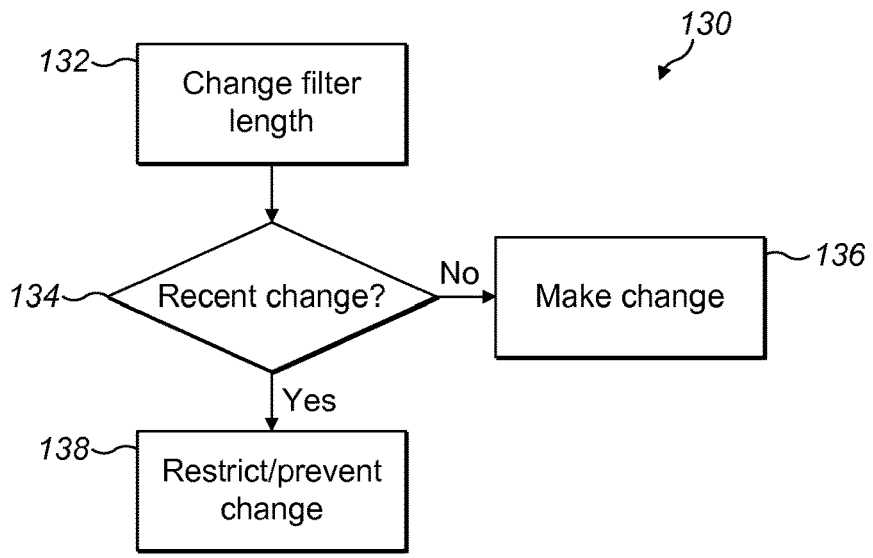
FIG. 13 is a flow chart showing algorithm in accordance with example embodiment.

By way of example, FIG. 13 is a flow chart showing algorithm, indicated generally by the reference numeral 130 in accordance with example embodiment. The algorithm 130 starts at operation 132 where an instruction (or some other indication) is received that a length of an RIR filter should be changed. At operation 134 it is determined whether a recent change (e.g. within a threshold time period) has been made. If not, the instructed or determined filter length change is made at operation 136. If a recent change has been made, the algorithm 130 moves to operation 138 where the instructed or determined change is prevent or restricted in some way. For example, the change may be delayed or prevented altogether. The algorithm 130 is provided by way of example only and many alternatives to the algorithm 130 will be apparent to those of ordinary skill in the art.

In the case that the estimated filter length is very long and thus could cause unwanted artefacts, a secondary measure for filter length change can be sound source volume. If the volume of a single source is low in the mix, safer values or relaxed methods (i.e., computational load) can be used.

System Geometry

The filter length of an RIR filter may be dependent (at least in part) on system geometry. For example, the initial delay can be set according to known recording geometry (e.g. by making use of location tags of the close-field and far-field microphones) and converting the distance the audio wave needs to travel to corresponding time delay and used as the initial delay (wireless microphone transmission channel delay and other hardware and software delay is neglected in this strategy).

Figure 14:
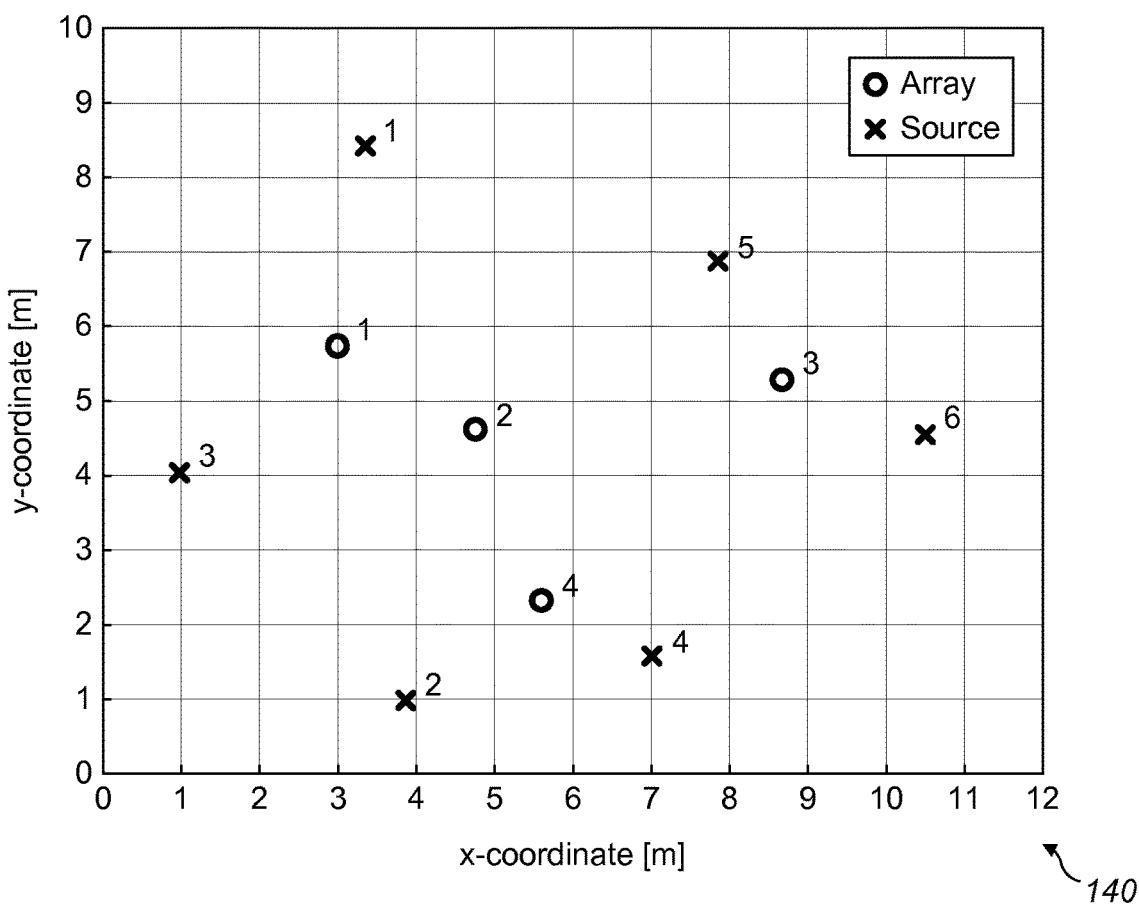
FIG. 14 shows example system geometries in accordance with an example embodiment.

An example recording geometry is illustrated in FIG. 14 and the corresponding ground truth direct-path delays are reported in Table 1 below:

TABLE 1

Ground truth direct path delays from offline estimated RIRs and based on the distance between source and receiver

| Array | Speaker | Distance (m) | Time (ms) | Frame | IR time (ms) |
|---|---|---|---|---|---|
| 2 | 1 | 4,109 | 11.9 | 2.1 | 11.6 |
| 2 | 2 | 3,772 | 10.9 | 2.0 | 10.8 |
| 2 | 3 | 3,852 | 11.2 | 2.0 | 10.9 |
| 2 | 4 | 3,779 | 11.0 | 2.0 | 11.0 |
| 2 | 5 | 3,847 | 11.2 | 2.0 | 11.0 |
| 2 | 6 | 5,755 | 16.7 | 2.6 | 16.6 |

Two ground truths are provided, the exact initial delay calculated from the offline estimated reference RIRs by cross-correlation based alignment of the direct-path peaks. Additionally, converting the source to receiver distance r in column 3 to time delay in column 4 ($\tau_{dir}$=r v, where v=345 m/s is the speed of sound) results in second ground truth by estimated recording geometry. The fifth column is the initial delay in frames converted from the values in column 4 by $$\hat{d}_{dir} = \tau_{dir} F_s / \left(\frac{N}{2}\right).$$

Figure 15:
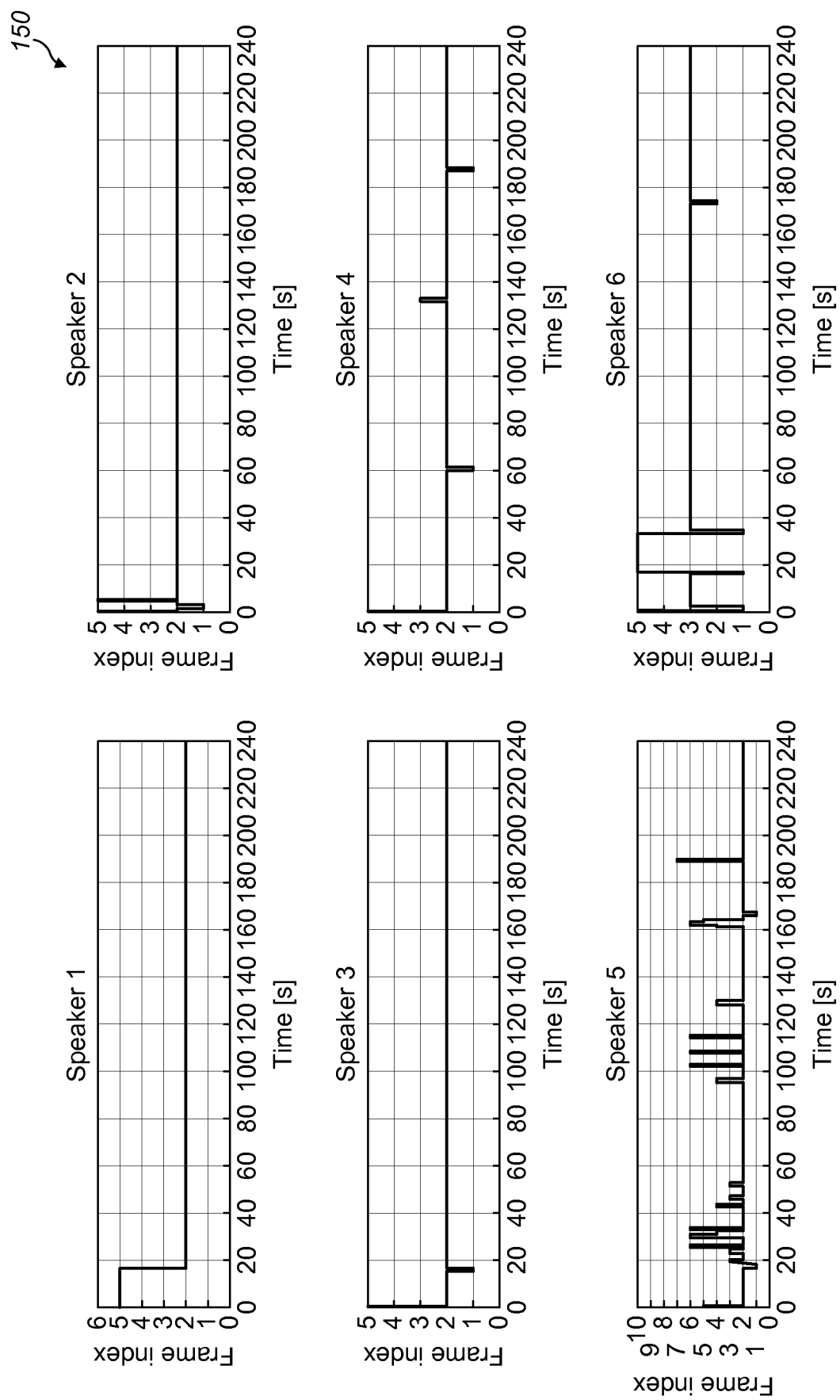
FIG. 15 shows detected direct-path delays in accordance with an example embodiment.

The direct-path delay estimation accuracy was measured by comparing the estimated direct-path delay $\hat{d}_t^{(p)}$ to the ground truth $\hat{d}_{dir}$ calculated from the offline estimated reference RIRs. The detected direct-paths using the proposed strategy and rock music content is illustrated in FIG. 15. The result figure indicates that the estimate of the direct-path delay is mostly correctly detected to be in the second frame of $h_{ftd}^{(p)}$. It should be noted that the direct path delay estimation accuracy in STFT domain is heavily quantized to only frame wise accuracy. Converting the estimated RIR into time-domain and searching for the sample-wise peak would yield more accurate analysis, however for the algorithm operation this would have no added benefit since the RIR filter lengths need to be defined on a frame level.

Moreover, a reverberation delay may be dependent (at least in part) on system geometry. For example, the system acoustic properties (e.g. hardness/softness of material used) may affect the reverberation in a manner that can be predicted and/or measured.

The system geometry may be determined, at least in part, from a locator tag associated with at least some of the microphones of a system. Alternatively, or in addition, system geometry can be detected from the audio outputs themselves.

Figure 16:
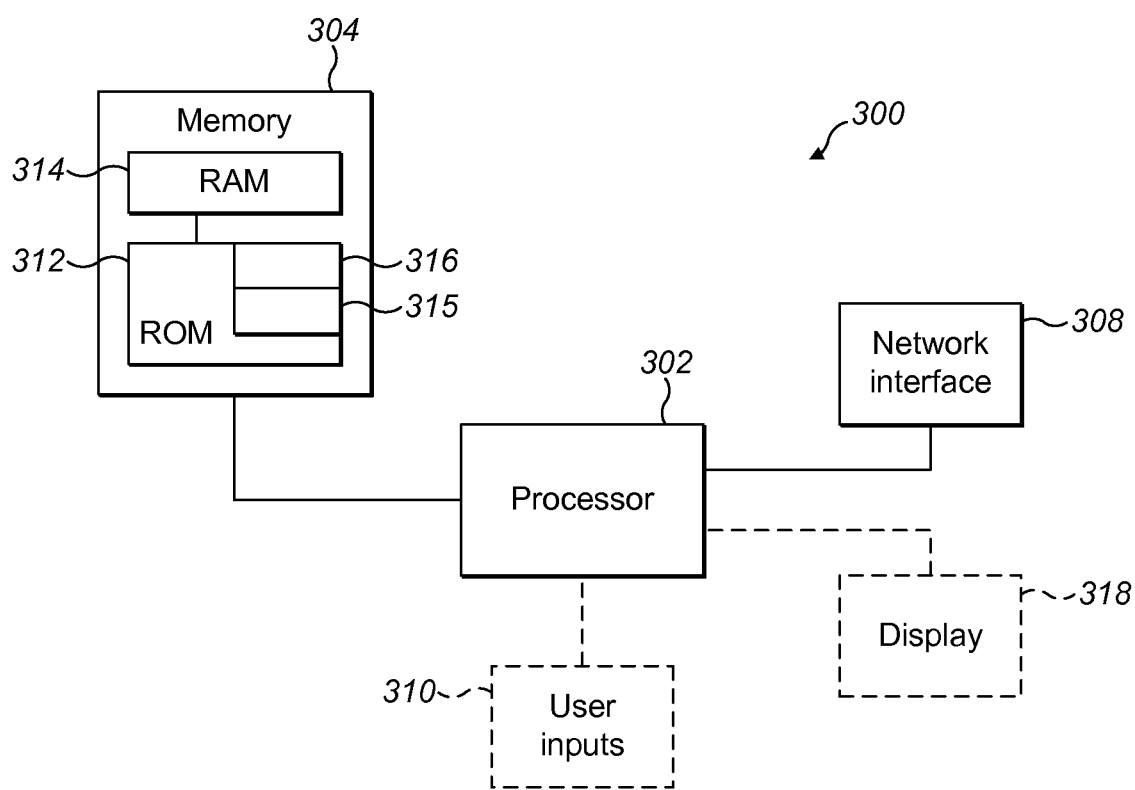
FIG. 16 is a block diagram of a system in accordance with an example embodiment.

For completeness, FIG. 16 is a schematic diagram of components of one or more of the example embodiments described previously, which hereafter are referred to generically as processing systems 300. A processing system 300 may have a processor 302, a memory 304 closely coupled to the processor and comprised of a RAM 314 and ROM 312, and, optionally, user input 310 and a display 318. The processing system 300 may comprise one or more network/apparatus interfaces 308 for connection to a network/apparatus, e.g. a modem which may be wired or wireless. Interface 308 may also operate as a connection to other apparatus such as device/apparatus which is not network side apparatus. Thus direct connection between devices/apparatus without network participation is possible.

The processor 302 is connected to each of the other components in order to control operation thereof.

The memory 304 may comprise a non-volatile memory, such as a hard disk drive (HDD) or a solid state drive (SSD). The ROM 312 of the memory 314 stores, amongst other things, an operating system 315 and may store software applications 316. The RAM 314 of the memory 304 is used by the processor 302 for the temporary storage of data. The operating system 315 may contain code which, when executed by the processor implements aspects of the algorithms 30, 60, 70 and 130 described above. Note that in the case of small device/apparatus the memory can be most suitable for small size usage i.e. not always hard disk drive (HDD) or solid state drive (SSD) is used.

The processor 302 may take any suitable form. For instance, it may be a microcontroller, a plurality of microcontrollers, a processor, or a plurality of processors.

The processing system 300 may be a standalone computer, a server, a console, or a network thereof. The processing system 300 and needed structural parts may be all inside device/apparatus such as IoT device/apparatus i.e. embedded to very small size In some example embodiments, the processing system 300 may also be associated with external software applications. These may be applications stored on a remote server device/apparatus and may run partly or exclusively on the remote server device/apparatus. These applications may be termed cloud-hosted applications. The processing system 300 may be in communication with the remote server device/apparatus in order to utilize the software application stored there.

Figure 17A:
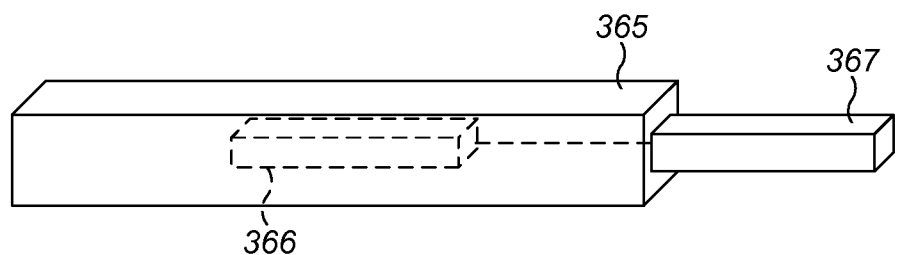
FIGS. 17A and 17B show tangible media, respectively a removable memory unit and a compact disc (CD) storing computer-readable code which when run by a computer perform operations according to example embodiments.
Figure 17B:
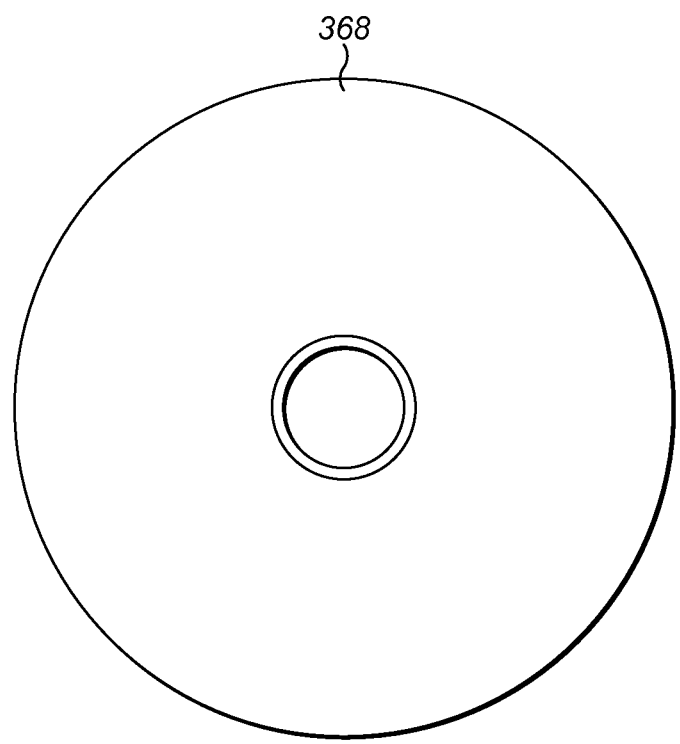

FIGS. 17A and 17B show tangible media, respectively a removable memory unit 365 and a compact disc (CD) 368, storing computer-readable code which when run by a computer may perform methods according to example embodiments described above. The removable memory unit 365 may be a memory stick, e.g. a USB memory stick, having internal memory 366 storing the computer-readable code. The memory 366 may be accessed by a computer system via a connector 367. The CD 368 may be a CD-ROM or a DVD or similar. Other forms of tangible storage media may be used. Tangible media can be any device/apparatus capable of storing data/information which data/information can be exchanged between devices/apparatus/network.

Embodiments of the present invention may be implemented in software, hardware, application logic or a combination of software, hardware and application logic. The software, application logic and/or hardware may reside on memory, or any computer media. In an example embodiment, the application logic, software or an instruction set is maintained on any one of various conventional computer-readable media. In the context of this document, a "memory" or "computer-readable medium" may be any non-transitory media or means that can contain, store, communicate, propagate or transport the instructions for use by or in connection with an instruction execution system, apparatus, or device, such as a computer.

Reference to, where relevant, "computer-readable storage medium", "computer program product", "tangibly embodied computer program" etc., or a "processor" or "processing circuitry" etc. should be understood to encompass not only computers having differing architectures such as single/multi-processor architectures and sequencers/parallel architectures, but also specialised circuits such as field programmable gate arrays FPGA, application specify circuits ASIC, signal processing devices/apparatus and other devices/apparatus. References to computer program, instructions, code etc. should be understood to express software for a programmable processor firmware such as the programmable content of a hardware device/apparatus as instructions for a processor or configured or configuration settings for a fixed function device/apparatus, gate array, programmable logic device/apparatus, etc.

As used in this application, the term "circuitry" refers to all of the following: (a) hardware-only circuit implementations (such as implementations in only analogue and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a server, to perform various functions) and (c) to circuits, such as a microprocessor(s) or a portion of a microprocessor(s), that require software or firmware for operation, even if the software or firmware is not physically present.

If desired, the different functions discussed herein may be performed in a different order and/or concurrently with each other. Furthermore, if desired, one or more of the above-described functions may be optional or may be combined. Similarly, it will also be appreciated that the flow diagrams of FIGS. 3, 5, 6 and 13 are examples only and that various operations depicted therein may be omitted, reordered and/or combined.

It will be appreciated that the above described example embodiments are purely illustrative and are not limiting on the scope of the invention. Other variations and modifications will be apparent to persons skilled in the art upon reading the present specification.

Moreover, the disclosure of the present application should be understood to include any novel features or any novel combination of features either explicitly or implicitly disclosed herein or any generalization thereof and during the prosecution of the present application or of any application derived therefrom, new claims may be formulated to cover any such features and/or combination of such features.

Although various aspects of the invention are set out in the independent claims, other aspects of the invention comprise other combinations of features from the described example embodiments and/or the dependent claims with the features of the independent claims, and not solely the combinations explicitly set out in the claims.

It is also noted herein that while the above describes various examples, these descriptions should not be viewed in a limiting sense. Rather, there are several variations and modifications which may be made without departing from the scope of the present invention as defined in the appended claims.

The invention claimed is:

1. An apparatus comprising at least one processor and at least one memory, said at least one memory including computer program code, the at least one memory and the computer program code configured to, with the at least one processor, cause the apparatus to perform at least:
   receive a near-field audio source signal from a near-field microphone;
   receive a far-field audio signal from an array comprising one or more far-field microphones;
   determine a filter length of a first portion of a room impulse response filter for the near-field microphone, wherein said filter length of said first portion is the same at each of a plurality of frequency bands of the filter and wherein said filter length of said first portion includes a direct acoustic propagation delay; and
   determine a filter length of a second portion of the room impulse filter at each of the plurality of frequency bands, wherein the filter length of said second portion is frequency-dependent.

2. The apparatus as claimed in claim 1, wherein to determine the filter length of the first portion of the room impulse response filter, the apparatus is further caused to generate a direct-path delay estimation.

3. The apparatus as claimed in claim 1, wherein to determine the filter length of the first portion of the room impulse response filter, the apparatus is further caused to obtain a room impulse response filter envelope for the near-field audio source signal and identify a delay corresponding to a maximum energy point of the envelope as an estimate of the direct acoustic propagation delay.

4. The apparatus as claimed in claim 3, wherein to determine the filter length of the first portion of the room impulse response filter, the apparatus is further caused to obtain a plurality of room impulse response filter envelopes for the near-field audio source signal and identify an average maximum energy point of the envelopes as an estimate of the direct acoustic propagation delay.

5. The apparatus as claimed in claim 1, wherein the apparatus is further caused to determine the filter length of the first portion of the room impulse response filter for each of a plurality of instances of near-field audio source signals received from a plurality of near-field microphones.

6. The apparatus as claimed in claim 1, wherein to determine at least one of the filter length of the first portion of the room impulse response filter or to determine the filter length of the second portion of the room impulse filter are adaptive.

7. The apparatus as claimed in claim 1, wherein the filter length of the second portion of the room impulse filter for each of the plurality of frequency bands comprises a reverberation time.

8. The apparatus as claimed in claim 1, wherein the apparatus is further caused to at least one of limit a rate of change of the filter length of the first portion or the filter length of the second portion of the room impulse response filter.

9. The apparatus as claimed in claim 8, wherein to limit the rate of change of the filter length, the apparatus is further caused to prevent a further change for a first period of time in the event that a change in filter length is determined.

10. The apparatus as claimed in claim 1, wherein to determine the filter length of the first portion of the room impulse response filter, the apparatus is caused to generate an estimate of said filter length of said first portion based on a system geometry.

11. The apparatus as claimed in claim 1, wherein to determine the filter length of the second portion of the room impulse filter, the apparatus is caused to generate an estimate of said filter length of said second portion based on a/the system geometry.

12. The apparatus as claimed in claim 10, wherein said system geometry is determined, at least in part, from a locator tag associated with the near-field microphone.

13. The apparatus as claimed in claim 1, wherein to determine the filter length of the first portion of the room impulse response filter, the apparatus is caused to generate an estimate of the filter length including considering at least one hardware or software delays.

14. A method comprising:
receiving a near-field audio source signal from a near-field microphone;
receiving a far-field audio signal from an array comprising one or more far-field microphones;
determining a filter length of a first portion of a room impulse response filter for the near-field microphone, wherein the filter length of said first portion is the same at each of a plurality of frequency bands of the filter and wherein the filter length of said first portion includes a direct acoustic propagation delay; and
determining a filter length of a second portion of the room impulse filter at each of the plurality of frequency bands, wherein the filter length of said second portion is frequency-dependent.

15. The method as claimed in claim 14, wherein determining the filter length of the first portion of the room impulse response filter comprises generating a direct-path delay estimation.

16. The method as claimed in claim 14, wherein determining the filter length of the first portion of the room impulse response filter comprises obtaining a room impulse response filter envelope for the near-field audio source signal and identifying a delay corresponding to a maximum energy point of the envelope as an estimate of the direct acoustic propagation delay.

17. The method as claimed in claim 14, further comprising determining the filter length of the first portion of the room impulse response filter for each of a plurality of instances of near-field audio source signals received from a plurality of near-field microphones.

18. The method as claimed in claim 14, wherein the filter length of the second portion of the room impulse filter for each of the plurality of frequency bands comprises a reverberation time.

19. The method as claimed in claim 14, further comprising limiting a rate of change of the filter length of the first portion and/or the filter length of the second portion of the room impulse response filter.

20. The method as claimed in claim 14, wherein determining the filter length of the first portion of the room impulse response filter comprises generating an estimate of said filter length of said first portion based on a system geometry and/or determining the filter length of the second portion of the room impulse filter comprises generating an estimate of said filter length of said second portion based on a/the system geometry.

* * * * *